United States Patent
Kaliski, Jr. et al.

(10) Patent No.: US 10,721,117 B2
(45) Date of Patent: *Jul. 21, 2020

(54) RESILIENT DOMAIN NAME SERVICE (DNS) RESOLUTION WHEN AN AUTHORITATIVE NAME SERVER IS UNAVAILABLE

(71) Applicant: VERISIGN, INC., Reston, VA (US)

(72) Inventors: Burton S. Kaliski, Jr., McLean, VA (US); Shumon Huque, Reston, VA (US); Eric Osterweil, Fairfax, VA (US); Frank Scalzo, Leesburg, VA (US); Duane Wessels, Moscow, ID (US); Glen Wiley, Goochland, VA (US)

(73) Assignee: VERISIGN, INC., Reston, VA (US)

( * ) Notice: Subject to any disclaimer, the term of this patent is extended or adjusted under 35 U.S.C. 154(b) by 148 days.

This patent is subject to a terminal disclaimer.

(21) Appl. No.: 15/670,747

(22) Filed: Aug. 7, 2017

(65) Prior Publication Data
US 2018/0375714 A1    Dec. 27, 2018

Related U.S. Application Data

(63) Continuation of application No. 15/633,655, filed on Jun. 26, 2017.

(51) Int. Cl.
*H04L 12/24* (2006.01)
*H04L 29/12* (2006.01)
(Continued)

(52) U.S. Cl.
CPC ...... *H04L 41/0654* (2013.01); *H04L 61/1511* (2013.01); *H04L 61/2076* (2013.01);
(Continued)

(58) Field of Classification Search
CPC .............. H04L 41/042; H04L 41/0654; H04L 61/1511; H04L 61/2076; H04L 69/40; H04W 24/04
See application file for complete search history.

(56) References Cited

U.S. PATENT DOCUMENTS 5,721,827 A    2/1998  Logan et al.
6,119,143 A    9/2000  Dias et al.
(Continued)

FOREIGN PATENT DOCUMENTS

JP    2005086700 A1    3/2005
WO    2000014938 A1    3/2000
(Continued)

OTHER PUBLICATIONS

Communication pursuant to Article 94(3)EPC for application No. 12187127.1, dated Sep. 15, 2017, 5 pages.
(Continued)

*Primary Examiner* — Mohamed A. Wasel
(74) *Attorney, Agent, or Firm* — Artegis Law Group, LLP

(57) ABSTRACT

A resolution resiliency application performs robust domain name system (DNS) resolution. In operation, the resolution resiliency application determines that an authoritative name server that is responsible for a domain name specified in a DNS query is unavailable. In response to determining that the authoritative name server is unavailable, the resolution resiliency application performs operation(s) that modify one or more DNS records stored in a cache based on one or more resiliency policies associated with the authoritative name server. The resolution resiliency application then generates a DNS response to the DNS query based on a DNS record stored in the modified cache. Notably, the disclosed techniques increase the likelihood of providing clients with DNS responses that accurately provide requested information.

20 Claims, 8 Drawing Sheets

(51) Int. Cl.
*H04W 24/04* (2009.01)
*H04L 29/14* (2006.01)

(52) U.S. Cl.
CPC .......... *H04L 61/6009* (2013.01); *H04L 69/40* (2013.01); *H04W 24/04* (2013.01); *H04L 41/042* (2013.01); *H04L 61/15* (2013.01)

(56) References Cited

U.S. PATENT DOCUMENTS

| | | | |
|---|---|---|---|
| 6,154,777 | A | 11/2000 | Ebrahim |
| 6,560,634 | B1 | 5/2003 | Broadhurst |
| 6,684,250 | B2 | 1/2004 | Anderson et al. |
| 6,728,767 | B1 | 4/2004 | Day et al. |
| 6,769,028 | B1 | 7/2004 | Sass et al. |
| 6,839,421 | B2 | 1/2005 | Esparza et al. |
| 7,152,118 | B2 | 12/2006 | Anderston, IV et al. |
| 7,299,491 | B2 | 11/2007 | Shelest et al. |
| 7,367,046 | B1 | 4/2008 | Sukiman et al. |
| 7,533,266 | B2 | 5/2009 | Bruekers et al. |
| 7,542,468 | B1 | 6/2009 | Begley et al. |
| 7,720,057 | B2 | 5/2010 | Igarashi |
| 7,725,536 | B2 | 5/2010 | Douglis |
| 7,796,978 | B2 | 9/2010 | Jones et al. |
| 7,864,709 | B2 | 1/2011 | Cheshire |
| 7,895,319 | B2 | 3/2011 | Statia et al. |
| 7,917,616 | B2 | 3/2011 | Trace et al. |
| 7,970,939 | B1 | 6/2011 | Satish et al. |
| 7,984,149 | B1 | 7/2011 | Grayson |
| 7,991,910 | B2 | 8/2011 | Richardson et al. |
| 8,468,351 | B2 | 6/2013 | Boesgaard Sorensen |
| 8,489,637 | B2 | 7/2013 | Patil |
| 8,521,908 | B2 | 8/2013 | Holmes et al. |
| 8,832,283 | B1 | 9/2014 | Roskind et al. |
| 9,060,038 | B2* | 6/2015 | Yale ................ H04L 61/2076 |
| 9,276,902 | B2* | 3/2016 | Treuhaft ........... H04L 29/12811 |
| 10,033,692 | B1* | 7/2018 | Vavrusa ............. H04L 67/2842 |
| 2001/0042109 | A1 | 11/2001 | Bolas et al. |
| 2002/0073335 | A1 | 6/2002 | Shuster |
| 2002/0099952 | A1 | 7/2002 | Lambert |
| 2003/0009591 | A1 | 1/2003 | Hayball et al. |
| 2003/0182447 | A1 | 9/2003 | Schilling |
| 2003/0195984 | A1 | 10/2003 | Zisapel et al. |
| 2004/0039798 | A1 | 2/2004 | Hotz |
| 2004/0128514 | A1 | 7/2004 | Rhoads |
| 2004/0210672 | A1 | 10/2004 | Pulleyn |
| 2005/0044352 | A1 | 2/2005 | Pazi et al. |
| 2005/0111384 | A1 | 5/2005 | Ishihara et al. |
| 2005/0213572 | A1 | 9/2005 | Huang et al. |
| 2006/0192994 | A1 | 8/2006 | Tanimoto |
| 2006/0242321 | A1 | 10/2006 | Hedge et al. |
| 2007/0033264 | A1 | 2/2007 | Edge et al. |
| 2007/0124487 | A1 | 5/2007 | Yoshimoto et al. |
| 2007/0204341 | A1 | 8/2007 | Rand et al. |
| 2008/0052758 | A1 | 2/2008 | Byrnes |
| 2008/0077695 | A1 | 3/2008 | Schmidt |
| 2008/0189774 | A1 | 8/2008 | Ansari et al. |
| 2008/0222306 | A1 | 9/2008 | Bhakta et al. |
| 2009/0055929 | A1 | 2/2009 | Lee et al. |
| 2009/0158318 | A1 | 6/2009 | Levy |
| 2009/0172192 | A1 | 7/2009 | Christian et al. |
| 2009/0182884 | A1 | 7/2009 | Datta et al. |
| 2010/0005146 | A1 | 1/2010 | Drako |
| 2010/0023611 | A1 | 1/2010 | Yang et al. |
| 2010/0037314 | A1 | 2/2010 | Perdisci et al. |
| 2010/0049872 | A1 | 2/2010 | Roskind |
| 2010/0057936 | A1 | 3/2010 | Roskind |
| 2010/0064047 | A1 | 3/2010 | Sullivan |
| 2010/0077462 | A1 | 3/2010 | Joffe et al. |
| 2010/0223364 | A1 | 9/2010 | Wei |
| 2010/0228819 | A1 | 9/2010 | Wei |
| 2010/0274970 | A1* | 10/2010 | Treuhaft ............. H04L 61/1511 711/118 |
| 2010/0284411 | A1 | 11/2010 | Mirani et al. |
| 2011/0035469 | A1 | 2/2011 | Smith et al. |
| 2011/0075675 | A1 | 3/2011 | Koodli et al. |
| 2011/0078292 | A1 | 3/2011 | Ananda et al. |
| 2011/0137973 | A1 | 6/2011 | Wei et al. |
| 2011/0153831 | A1 | 6/2011 | Mutnuru et al. |
| 2011/0238192 | A1 | 9/2011 | Shah |
| 2012/0117621 | A1 | 5/2012 | Kondamuru |
| 2012/0143982 | A1 | 6/2012 | Oster et al. |
| 2012/0147834 | A1 | 6/2012 | Zisimopoulos et al. |
| 2012/0173684 | A1 | 7/2012 | Courtney |
| 2012/0185914 | A1 | 7/2012 | Delco |
| 2012/0191874 | A1 | 7/2012 | Robinson |
| 2012/0284505 | A1 | 11/2012 | Smith et al. |
| 2012/0303804 | A1 | 11/2012 | Sundaram et al. |
| 2012/0321052 | A1 | 12/2012 | Morrill et al. |
| 2013/0018944 | A1 | 1/2013 | Shyamsunder |
| 2013/0019311 | A1 | 1/2013 | Swildens et al. |
| 2013/0198065 | A1 | 8/2013 | McPherson et al. |
| 2013/0198269 | A1 | 8/2013 | Fleischman et al. |
| 2014/0036897 | A1 | 2/2014 | Frydman |
| 2014/0068043 | A1 | 3/2014 | Archbold |
| 2014/0149601 | A1 | 5/2014 | Carney |
| 2014/0195692 | A1* | 7/2014 | Treuhaft ............. H04L 61/3025 709/229 |
| 2014/0207835 | A1 | 7/2014 | Jellick |
| 2014/0280963 | A1 | 9/2014 | Burbridge |
| 2014/0282847 | A1 | 9/2014 | Blacka |
| 2015/0058488 | A1* | 2/2015 | Backholm ........... H04L 61/1511 709/226 |
| 2015/0074221 | A1 | 3/2015 | Kuparinen |
| 2015/0295882 | A1 | 10/2015 | Kaliski, Jr. |
| 2016/0021055 | A1 | 1/2016 | Krzywonos et al. |
| 2016/0164827 | A1* | 6/2016 | Treuhaft ........... H04L 29/12811 709/245 |
| 2016/0205078 | A1 | 7/2016 | James et al. |
| 2016/0205106 | A1 | 7/2016 | Yacoub et al. |
| 2016/0259932 | A1 | 9/2016 | Lakshmanan et al. |
| 2016/0286001 | A1 | 9/2016 | Chan et al. |
| 2016/0337263 | A1 | 11/2016 | Imai |
| 2016/0337311 | A1 | 11/2016 | Le Rouzic et al. |
| 2017/0019371 | A1 | 1/2017 | OsterWeil et al. |
| 2017/0085380 | A1 | 3/2017 | Pandrangi et al. |
| 2017/0118250 | A1 | 4/2017 | Phillips |
| 2017/0171242 | A1* | 6/2017 | Akcin ................. G06F 16/9566 |
| 2017/0331789 | A1 | 11/2017 | Kumar et al. |

FOREIGN PATENT DOCUMENTS

| | | |
|---|---|---|
| WO | 2006114133 A1 | 11/2006 |
| WO | 20120623382 A1 | 5/2012 |

OTHER PUBLICATIONS

Non-Final Office Action for U.S. Appl. No. 13/389,554, dated Nov. 14, 2014, 193 pages.
Notice of Allowance for U.S. Appl. No. 13/828,070, dated Jan. 30, 2015, 17 pages.
Final Office Action for U.S. Appl. No. 13/389,554, dated Apr. 6, 2015, 198 pages.
Author Unknown, "What does a DNS request look like?", Server Fault, http://serverfault.com/questions/173187/what-does-a-dns-request-look-like, Aug. 22, 2010, pp. 1-4.
Extended European Search Report for Application No. 14160024.7, dated Jun. 4, 2014, 5 pages.
Final Office Action for U.S. Appl. No. 13/389,554, dated Jun. 13, 2014, 17 pages.
Final Office Action for U.S. Appl. No. 13/389,554, dated Mar. 7, 2014, 2014, 13 pages.
Non-Final Office Action for U.S. Appl. No. 13/389,554, dated Sep. 23, 2013, 8 pages.
M. Tariq Banday, "Recent Developments in the Domain Name System", International Journal of Computer Applications (0975-8887), vol. 31, No. 2, Oct. 2011, 8 pages.
Extended European Search Report for Application No. 15163265.0, dated Aug. 27, 2015, 4 pages.
C. Contavalli, "Client IP Information in DNS Requests", IETF, http://tools.ietf.org/pdf/draft-vandergaast-edns-client-p-01.pdf, May 21, 2010, 24 pages.

(56) References Cited

OTHER PUBLICATIONS

Ballani et al., "Towards a global IP Anycast service", http://research.microsoft.com/en-us/um/people/hiballan/talks/talk-sigcomm05-pias.pdf, accessed Mar. 14, 2013, 62 pages.

Non-Final Office Action for U.S. Appl. No. 13/836,682, dated Sep. 3, 2013, 8 pages.

Jeff Tyson, "How Encryption Works", Dec. 6, 2005, howstuffw"orks.com, retrieved from Wayback Machine http:/fweb .archive. org/web/20051206043803/http ://computer.h owstuffw"orks. com/en cryption/htm/printable, 4 pages.

Basu et al., "Persistent Delivery With Deferred Binding to Descriptively Named Destinations", MILCOM 2008-2008 IEEE Military Communications Conference, 8 pages.

Extended European Search Report for Application No. 12187127, dated Jan. 22, 2013, 4 pages.

Eastlake, Donald, "Domain Name System Security Extensions; draft-ieff-dnsseo-secext2-07.txt." 19881201, vol. dnssec, No. 7, 1998-1988, 44 pages.

Kiril Lashchiver, Domain Name System Anomaly Detection and Prevention, Thesis of School Engineering and computer Science, The Hebrew University of Jerusalem; Jerusalem, Israel, Sep. 2010, pp. 1-57.

But et al., "Evaluting the Impact of DNS and HTIP Session Characteristics on Consumer ISP Web Traffic," TenCon2005, http://caia.swin.edu.au, Nov. 2005, 6 pages.

Karygiannis, Tom et al. Challenges in Securing the Domain Name System. Emerging Standards, Jan./Feb. 2006, pp. 84-87.

Teddy Mantoro et al. An Implementation of Domain Name System Security Extensions Framework for the Support of 1Pv6 Environment, 2011 International Conference on Multimedia Computing and Systems (ICMCS), Apr. 7-9, 2011, pp. 1-6.

Candramouli et al., "Challenges in Securing the Domain Name System," www.computer.org/security/, The IEEE Computer Society, Jan./Feb. 2006, pp. 84-87.

International Search Report for application No. PCT/US2018/039463 dated Oct. 15, 2018.

Andrews, M., "Negative Caching of DNS Queries (DNS NCACHE); rfc2308.txt", Network Working Group, Mar. 1, 1998, 20 pages.

D. Lawrence and W. Kumari. Serving Stale Data to Improve DNS Resiliency. Internet-Draft draft-tale-dnsop-serve-stale-01, Jun. 27, 2017. https://datatracker.ietf.org/doc/html/draft-tale-dnsop-serve-stale.

W. Kumari. Stretching DNS TTLs. Internet-Draft draft-wkumari-dnsop-ttl-stretching-00, Nov. 14, 2016 (expired). https://datatracker.ietf.org/doc/draft-wkumari-dnsop-ttl-stretching/.

W. Kumari, R. Arends, S. Woolf, and D. Migault. Highly Automated Method for Maintaining Expiring Records. Internet-Draft draft-wkumari-dnsop-hammer-03, Jun. 27, 2017. https://datatracker.ietf.org/doc/draft-wkumari-dnsop-hammer/.

Google, IPR details for U.S. Pat. No. 8,832,283, Issued Sep. 9, 2014, https://datatracker.ietf.org/ipr/3060/, 3 pages.

Google, IPR details for U.S. Pat. No. 8,832,283, Issued Sep. 9, 2014, https://datatracker.ietf.org/ipr/3059/, 7 pages.

Non-Final Office Action for U.S. Appl. No. 15/881,596, dated Jan. 26, 2020, 19 pages.

Non-Final Office Action for U.S. Appl. No. 15/881,590, dated Feb. 10, 2020, 13 pages.

Non-Final Office Action for U.S. Appl. No. 15/633,655, dated Feb. 10, 2020, 12 pages.

\* cited by examiner

RESILIENT DOMAIN NAME SERVICE (DNS) RESOLUTION WHEN AN AUTHORITATIVE NAME SERVER IS UNAVAILABLE

CROSS-REFERENCE TO RELATED APPLICATIONS

This application is a continuation of the co-pending U.S. patent application titled, "RESILIENT DOMAIN NAME SERVICE (DNS) RESOLUTION WHEN AN AUTHORITATIVE NAME SERVER IS UNAVAILABLE," filed on Jun. 26, 2017 and having Ser. No. 15/633,655. The subject matter of this related application is hereby incorporated herein by reference.

BACKGROUND OF THE INVENTION

Field of the Invention

Embodiments of the present invention relate generally to computer networks and, more specifically, to resilient domain name service (DNS) resolution when an authoritative name server is unavailable.

Description of the Related Art

As is well known, the domain name service (DNS) is the part of the Internet infrastructure that translates human-readable domain names into the Internet Protocol (IP) numbers needed to establish TCP/IP (Transmission Control Protocol/Internet Protocol) communications over the Internet. In that regard, the DNS is the mechanism that allows users to refer to web sites and other Internet resources via intuitive domain names, such as "example.com," rather than the actual numeric IP addresses, e.g., 192.0.2.78, that are associated with different websites and other Internet resources. As referred to herein, an "Internet resource" may be any type of device or service that is accessible via the Internet.

Each domain name is typically made up of a series of character strings or "labels," where adjacent such character strings within the domain name are separated by a dot. The right-to-left order of the labels within a domain name corresponds to a top-to-bottom order of domain names in a DNS hierarchy. In a process referred to as "DNS resolution," a recursive resolver traverses the DNS hierarchy via authoritative name servers to translate the domain names specified in various DNS queries into corresponding IP addresses associated with different Internet resources.

One problem that may be encountered during DNS resolution is that an authoritative name server may be in a degraded state and, consequently, may not provide information required to successfully translate a domain name. For example, a recursive resolver could receive a DNS query for the IP address of "example.com" from a user. As part of DNS resolution, the recursive resolver could transmit the DNS query to an authoritative name server that is in a degraded state and, accordingly, is offline or not accessible. In such a scenario, the authoritative name server would be unable to properly respond to the DNS query, which would result in the recursive resolver being unable to provide the IP address of "example.com" to the user.

To reduce the impact on users when an authoritative name server is in a degraded state, some recursive resolvers attempt to perform DNS resolution based on stale DNS records stored in a cache. As a general matter, each recursive resolver maintains a cache that stores some set of DNS records previously received from authoritative name servers. Each of the DNS records provides a mapping from a domain name to an IP address and is associated with a time-to-live (TTL), where the TTL is intended to limit the lifespan of the DNS record to prevent the use of out-of-date information. Specifically, when the time specified by the TTL associated with a particular DNS record elapses (i.e., the TTL on the cached DNS record "expires"), the DNS record is referred to as "stale."

One drawback to performing DNS resolution based on stale DNS records is that not all DNS records are stored in the applicable cache. In the event a DNS record necessary to resolving a particular domain name is missing from the cache, a recursive resolver is not going to be able to provide the IP address for that domain name. Further, and potentially worse, the authoritative name server may be offline because of an error that propagated invalid DNS records to recursive resolvers. In these types of situations, indiscriminately extending TTLs increases the amount of time that the recursive resolver exposes users to potentially invalid records.

As the foregoing illustrates, what is needed in the art are more effective techniques for DNS resolution when an authoritative name server is in a degraded state.

SUMMARY OF THE INVENTION

One embodiment of the present invention sets forth a method for performing domain name system (DNS) resolution. The method includes determining that a first authoritative name server that is responsible for a domain name specified in a first DNS query is unavailable; in response to determining that the first authoritative name server is unavailable, performing one or more operations on a first cache based on one or more resiliency policies associated with the first authoritative name server to modify the first cache, where the first cache is used to store DNS records; and generating a first DNS response to the first DNS query based on a first DNS record stored in the modified first cache.

Further embodiments provide, among other things, a computer-readable medium and a system configured to implement the method set forth above.

One advantage of the disclosed techniques is that a recursive resolver may enable a client to access an Internet resource after the recursive resolver fails to obtain an associated DNS record from an authoritative name server. Notably, unlike conventional approaches that attempt to perform DNS resolution based on stale DNS records included in a cache, the disclosed techniques attempt to modify the cache to enable DNS resolution based on valid DNS records. As a result, the disclosed techniques increase the ability of clients to properly access Internet resources compared to conventional approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
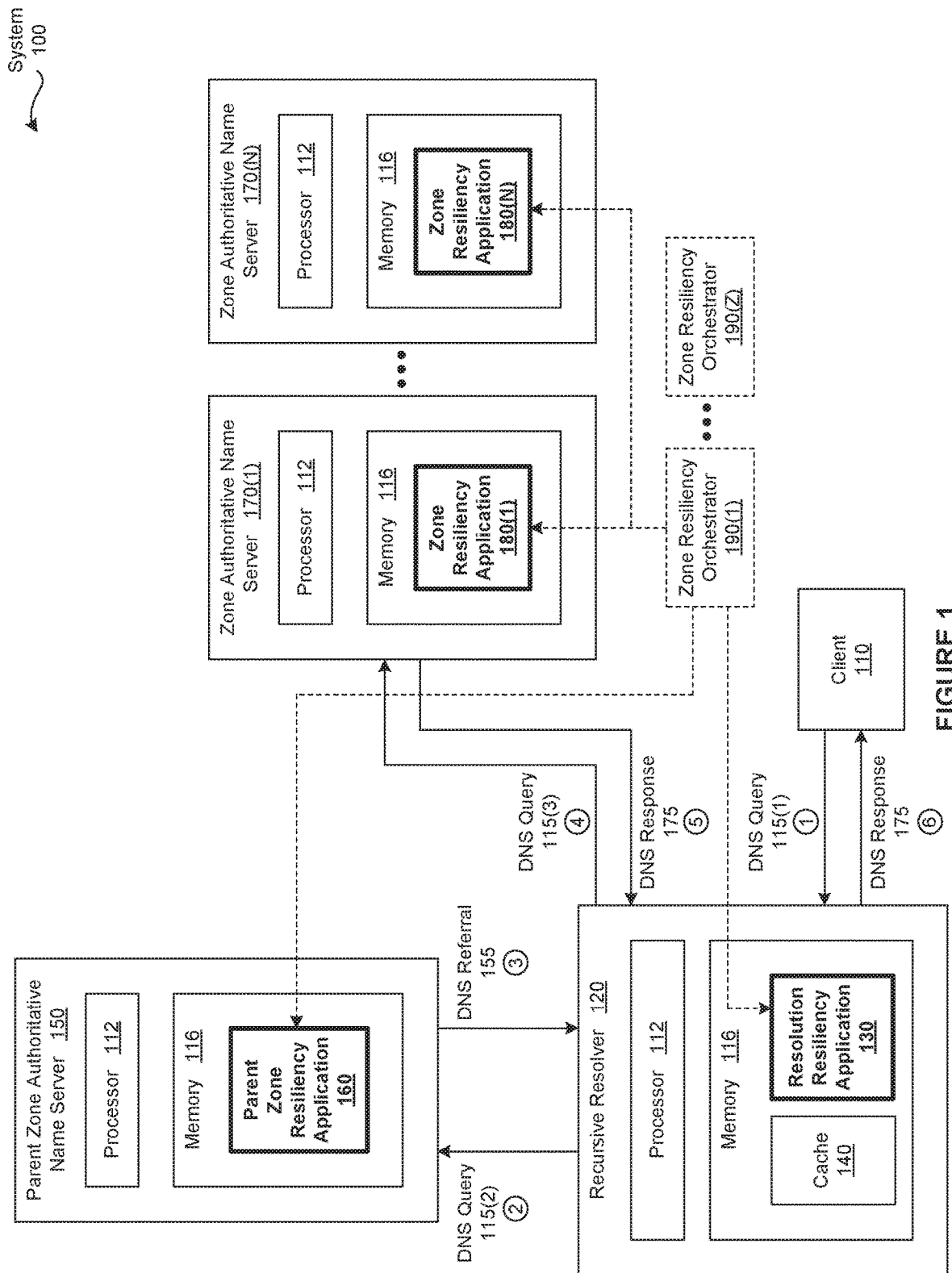
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a client 110, a recursive resolver 120, a parent zone authoritative name server 150, and one or more zone authoritative name servers 170. In alternate embodiments, the system 100 may include any number of clients 110, any number of recursive resolvers 120, any number of parent zone authoritative name servers 150, and any number of zone authoritative name servers 170 in any combination. As depicted with dotted boxes, the system 100 may include any number (including zero) of resiliency orchestrators 190. Each of the resiliency orchestrators 190 may comprise a server or a software application. For explanatory purposes, multiple instances of like objects are denoted with reference numbers identifying the object and parenthetical numbers identifying the instance where needed.

As shown, each of the client 110, the recursive resolver 120, the parent zone authoritative name server 150, and the zone authoritative name servers 170 include, without limitation, a processor 112 and a memory 116. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the associated processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, each of the client 110, the recursive resolver 120, the parent zone authoritative name server 150, and the zone authoritative name servers 170 may include any number (including zero) and types of processors 112 and any number (including zero) and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC).

In some embodiments, the client 110, the recursive resolver 120, the parent zone authoritative name server 150 and/or the zone authoritative name servers 170 may interact with one or more clouds (e.g., encapsulated shared resources, software, data, etc.) to perform operations associated with the system 100. In such embodiments, the processor 112 and/or the memory 116 may be implemented in the cloud instead of in the client 110, the recursive resolver 120, the parent zone authoritative name server 150 and/or the zone authoritative name servers 170.

As a general matter, the system 100 includes, without limitation, entities and software that provide underlying technologies to support essential Internet functions, such as communications and security. In particular, the recursive resolver 120, the parent zone authoritative name server 150, and the zone authoritative name servers 170 provide a portion of a framework that implements the domain name system (DNS) protocol. For explanatory purposes, entities that provide the framework that implements the DNS protocol, including the recursive resolver 120, the parent zone authoritative name server 150, and the zone authoritative name servers 170, are referred to herein as "DNS servers." Further, the parent zone authoritative name server 150 and the zone authoritative name servers 170 are referred to herein as "authoritative name servers." In alternate embodiments, the system 100 may include any number and types of other DNS servers in addition to the recursive resolver 120, the parent zone authoritative name servers 150, and the zone authoritative name servers 170. For example, in various embodiments, the system 100 may include forwarding resolvers.

The DNS is the part of the Internet infrastructure that translates human-readable domain names into the Internet Protocol (IP) numbers needed to establish TCP/IP (Transmission Control Protocol/Internet Protocol) communications over the Internet. In that regard, the DNS is the mechanism that allows users to refer to web sites and other Internet resources via intuitive domain names, such as "example.com," rather than the actual numeric IP addresses, e.g., 192.0.2.78, that are associated with different websites and other Internet resources. Each domain name is typically made up of a series of character strings or "labels," where adjacent such character strings within the domain name are separated by a dot. The right-to-left order of the labels within a domain name corresponds to the top-to-bottom order of domain names in a DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels.

In general, the DNS enables users to associate a variety of information with domain names based on resource records. Resource records are also referred to herein as "DNS records." For example, in addition to storing address records that map domain names to IP addresses, the DNS stores service records (SRV) that identify services. Further, the DNS stores text records (TXT) that include arbitrary text and enable the DNS to serve as a general purpose database. A hierarchy of the DNS servers included in the system 100 maintain the resource records in large databases.

More specifically, each of any number of authoritative name servers store address records for a portion of a domain known as a "zone" for which the authoritative name server is responsible. Further, each authoritative name server may store name server records that delegate responsibility for the remaining portions of the domain to other authoritative name servers. For explanatory purposes only, as referred to herein, the parent zone authoritative name server 150 is responsible for a portion of a particular domain referred to herein as the "parent zone." Further, the parent zone authoritative name server 150 delegates responsibility for a subdomain of the particular domain to the zone authoritative name servers 170. For example, the parent zone authoritative name server 150 could be responsible for the zone "example.com," and the zone authoritative name server 170(1) could be responsible for the zone "my.example.com."

In a process referred to herein as "DNS resolution," DNS servers traverse the DNS hierarchy to translate the domain names specified in various DNS queries 140 into corresponding IP addresses associated with different Internet resources. As referred to herein, an "Internet resource" may be any type of device or service that is accessible via the Internet.

For explanatory purposes only, FIG. 1 depicts a sequence of events involved in a DNS resolution process using a series of numbered bubbles. First, as depicted with the bubble numbered 1, the client 110 generates and transmits the DNS query 115(1) to the recursive resolver 120. The DNS query 115(1) requests information associated with a domain name. The client 110 is any entity capable of transmitting a DNS query 115 that requests information based on a domain name to a DNS server. For example, in various embodiments, the client 110 may be a stub resolver, a web browser, or an operating system, to name a few.

The client 110 may transmit the DNS query 115(1) in response to any type of event. For example, suppose that a user visits a website "example.com" via a web browser executing on a computer. Further, suppose that a cache associated with the client 110 (e.g., stub resolver) executing on the computer does not include a suitable translation for "example.com" to a corresponding IP address. In such a scenario, the client 110 could generate and transmit the DNS query 115(1) requesting the IP address associated with "example.com" to the recursive resolver 120. The recursive resolver 120 is a DNS server that may be configured to traverse the DNS hierarchy to obtain a DNS response 175 to the DNS query 115(1).

Upon receiving the DNS query 115(1), the recursive resolver 120 attempts to respond to the DNS query 115(1) based on information stored in a cache 140 associated with the recursive resolver 120. As a general matter, the recursive resolver 120 maintains the cache 140 that stores some set of DNS records previously received from the authoritative name servers. Each of the DNS records provides a mapping from a domain name to an IP address and is associated with a time-to-live (TTL), where the TTL is intended to limit the lifespan of the DNS record to prevent the use of out-of-date information. Specifically, when the time specified via the TTL associated with a particular DNS record elapses, the DNS record is referred to herein as a "stale" DNS record.

If the cache 140 associated with the recursive resolver 120 does not include the information requested in the DNS query 115(1), then the recursive resolver 120 traverses the DNS hierarchy in an attempt to obtain the requested information. The recursive resolver 120 may traverse the DNS hierarchy in any technically feasible fashion that is consistent with the DNS protocol. For example, the recursive resolver 120 may begin traversing the DNS hierarchy at the root level.

In general, each of the authoritative name servers is configured to answer the DNS queries 115 based on information contained in the associated portion of the DNS hierarchy. Each of the authoritative name servers may answer the DNS query 115 in any manner that is consistent with the DNS protocol. For example, in some embodiments, each of the authoritative name servers may answer the DNS query 115 with a positive DNS response 175, a negative DNS response 175, ora DNS referral 155. The positive DNS response 175 provides the requested information based on the portion of the DNS hierarchy associated with the authoritative name server. The negative DNS response 175 indicates that the authoritative name server is unable to provide the requested information. The referral DNS response 155 specifies another authoritative name server that may be able to provide the requested information.

As depicted with the bubble numbered 2, after receiving the DNS query 115(1) from the client 110, the recursive resolver 120 generates and transmits the DNS query 115(2) to the parent zone authoritative name server 150. In response to the DNS query 115(2) and as depicted with the bubble numbered 3, the parent zone authoritative name server 150 transmits the DNS referral 155 to the recursive resolver 120. The DNS referral 155 specifies the zone authoritative name server 170(1).

As depicted with the bubble numbered 4, the recursive resolver 120 then generates and transmits the DNS query 115(3) to the zone authoritative name server 170(1). The zone authoritative name server 170(1) is able to provide the requested information based on the associated portion of the DNS hierarchy. Consequently, as depicted with the bubble numbered 5, the zone authoritative name server 170 transmits the DNS response 175 to the recursive resolver 120. As depicted with the bubble numbered 6, upon receiving the DNS response 175, the recursive resolver 120 forwards the DNS response 175 to the client 110.

One problem that may be encountered during DNS resolution is that an authoritative name server may be in a degraded state and, consequently, may not provide information required to successfully translate a domain name. As referred to herein, a "degraded" state refers to a state in which associated information may be erroneous or out-of-date, or in which associated operations are unavailable or reduced (e.g., a server is offline or one or more operational capabilities are reduced). For explanatory purposes only, an authoritative name server that is in a degraded state is also referred to herein as a "degraded" authoritative name server. Notably, an authoritative name server may be considered "degraded" when any DNS records associated with the zone for which the authoritative name server is responsible are corrupted.

In some instances, a moderately degraded authoritative name server 170 may provide a negative DNS response 175 that indicates that the server failed to complete the DNS response 175. In the same or other instances, a degraded authoritative name server 170 may provide DNS responses 175 including DNS records that are out-of-date due to operator error (e.g., changes made by the owner of an associated domain name). Notably, an authoritative name server may be considered "degraded" when any DNS records associated with the zone for which the authoritative name server is responsible are corrupted. In yet other instances, the recursive resolver 120 may experience a time out when attempting to transmit the DNS query 115 or receive the DNS response 175 to a severely degraded zone authoritative name server 170.

For example, the recursive resolver 120 could receive the DNS query 115 for the IP address of "example.com" from the client 110. As part of DNS resolution, the recursive resolver 120 could transmit the DNS query 115 to the zone authoritative name server 170 when the zone authoritative name server 170 is in a severely degraded state and, accordingly, is offline or unavailable. In such a scenario, the zone authoritative name server 170 would be unable to properly respond to the DNS query 115, which would result in the recursive resolver 120 being unable to provide the IP address of "example.com" to the client 110.

To reduce the impact on users when an authoritative name server is in a degraded state, some conventional recursive resolvers attempt to perform DNS resolution based on stale DNS records stored in a cache. One drawback to performing DNS resolution based on stale DNS records is that not all DNS records are stored in the applicable cache. In the event a DNS record necessary to resolving a particular domain name is missing from the applicable cache, the conventional recursive resolver is not going to be able to provide the IP address for that domain name. Further, and potentially worse, the authoritative name server may be offline because of an error that propagated invalid DNS records to the conventional recursive resolver. In these types of situations, indiscriminately extending TTLs increases the amount of time that the conventional recursive resolver exposes clients to potentially invalid records.

Increasing the Resiliency of DNS Resolution

To enable the recursive resolver 120 to more effectively perform DNS resolution when one or authoritative name servers are in degraded states, the system 100 includes, without limitation, a resolution resiliency application 130, a parent zone resiliency application 160, and a zone resiliency application 180. The resolution resiliency application 130, the parent zone resiliency application 160, and the zone resiliency application 180 are also collectively referred to herein as the "resiliency applications."

As shown, the resolution resiliency application 130 comprises a software program that resides in the memory 116 associated with the recursive resolver 120 and executes on the processor associated with the recursive resolver 120. The parent zone resiliency application 160 comprises a software program that resides in the memory 116 associated with the parent zone authoritative name server 150 and executes on the processor associated with the parent zone authoritative name server 150. The zone resiliency application 180 comprises a software program that resides in the memory 116 associated with the zone authoritative name server 180 and executes on the processor associated with the zone authoritative name server 180.

For explanatory purposes only, the resiliency applications and associated techniques are described in the context of increasing the resiliency of DNS resolution when the zone authoritative name servers 170(1) is in a degraded state. However, as persons skilled in the art will recognize, the disclosed techniques may increase the resiliency of DNS resolution when any number and type of authoritative name servers are in degraded states. For example, in some embodiments, the disclosed techniques may increase the resiliency of DNS resolution when the parent zone authoritative name server 150 is unavailable. In various embodiments, the functionality included in any combination of the resiliency applications may be combined or spread across any number of the resiliency applications.

In operation, the resiliency applications include three broad categories of functionality that increase the resiliency of DNS resolution. Firstly, the resiliency applications provide indications that an authoritative name server is in a degraded state. Secondly, the resiliency applications mitigate the impact of a degraded authoritative name server on the clients 110. Thirdly, the resiliency applications facilitate the recovery of a previously degraded authoritative name server. In various embodiments, each of the resiliency applications may provide any number and type of functionality in any of the categories. Further, in various embodiments, each of the resiliency applications provide functionality in any of the categories independently of or in collaboration with any number of the other resiliency applications.

In alternate embodiments each of the resiliency applications may execute on any processor that is associated with any type of device and reside in any memory that is associated with any type of device. For instance, in some embodiments, the resolution resiliency application 130 may execute and reside in a server other than the recursive resolver 120. In the same or other embodiments, the zone resiliency application 180 may execute and reside in a server other than the zone authoritative name server 170. In the same or other embodiments, the parent zone resiliency application 160 may execute and reside in a server other than the parent zone authoritative name server 150.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques.

Indicating Degraded States

Figure 2:
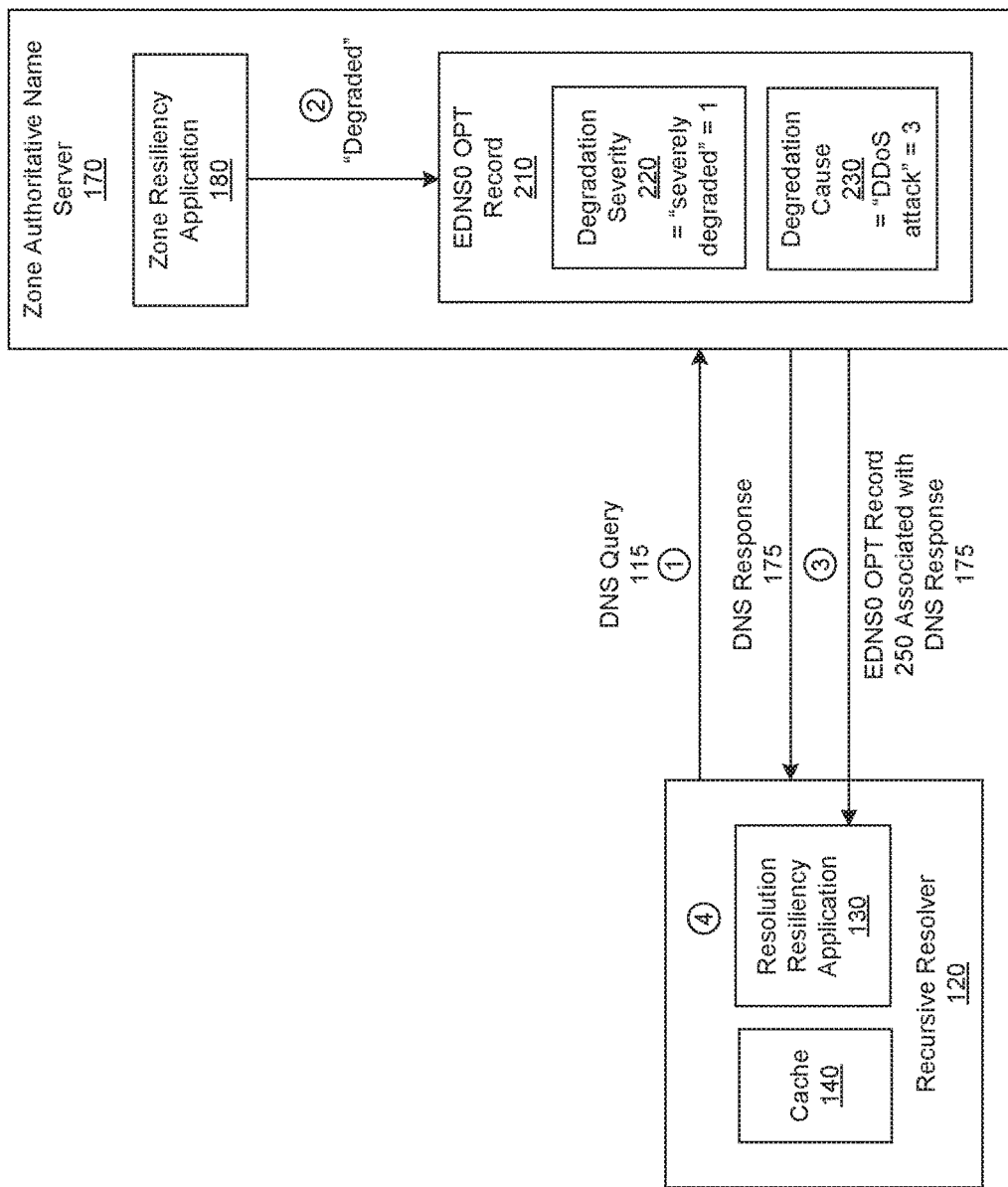
FIG. 2 illustrates a process implemented by the zone resiliency application of FIG. 1 for indicating that the zone authoritative name server is in a degraded state during domain name system (DNS) resolution, according to various embodiments of the present invention.

FIG. 2 illustrates a process implemented by the zone resiliency application 180 of FIG. 1 for indicating that the zone authoritative name server is in a degraded state during domain name system (DNS) resolution, according to various embodiments of the present invention. As shown, the zone resiliency application 180 generates an Extension Mechanisms for DNS Version 0 (EDNSO) OPT record 210 when the zone authoritative name server 170 is in a degraded state. The EDNSO OPT record 210 is a pseudo resource record that the zone resiliency application 180 attaches to the DNS response 175 in compliance with DNS Extension protocols. Notably, the EDNSO OPT record 210 provides information to DNS servers but is not included in the DNS hierarchy that is maintained by the DNS servers.

The EDNSO OPT record 210 includes, without limitation, a degradation severity 220 and a degradation cause 230. The degradation severity 220 specifies a level of severity that characterizes a degraded state of the zone authoritative name server 170. For example, the degraded severity 220 could equal 1, 2, or 3 to specify, respectively, that the zone authoritative name server 170 is in a severely degraded state, a partially degraded state, or a slightly degraded state.

The degradation cause 230 specifies a cause of a degraded state of the zone authoritative name server 170. For example, the degradation cause 230 could equal 1, 2, or 3 to specify that the zone authoritative name server 170 is in a degraded state attributable to, respectively, maintenance, network partitioning operations, or a distributed denial-of-service (DDoS) attack. In alternate embodiments, the EDNSO OPT record 210 may include any number and type of information that is related to a state associated with the zone authoritative name server 170 in any format.

The zone resiliency application 180 may attach the EDNSO OPT record 210 to any type of DNS response 175. For example, if the zone authoritative name server 170 is in a slightly degraded state, then the zone resiliency application 180 could attach the EDNSO OPT record 210 to the positive DNS response 175 that provides the requested information. In another example, if the zone authoritative name server 170 is in a severely degraded state, then the zone resiliency application 180 could attach the EDNSO OPT record 210 to the negative DNS response 175 that specifies that the server is unavailable and does not provide the requested information.

For explanatory purposes only, FIG. 2 depicts a sequence of events involved in DNS resolution using a series of numbered bubbles. First, as depicted with the bubble numbered 1, the recursive resolver 120 transmits the DNS query 175 to the zone authoritative name server 170. The DNS query 175 requests information associated with a domain name that is included in the zone for which the zone authoritative name server 170 is responsible.

As depicted with the bubble numbered 2, when the zone authoritative name server 170 receives the DNS query 115, the zone resiliency application 180 determines or has recently determined that the zone authoritative name server 170 is in a degraded state. The zone resiliency application 180 then determines or has recently determined the degradation severity 220 and the degradation cause 230. The zone resiliency application 180 may determine that the zone authoritative name server 170 is in a degraded state, the degradation severity 220, and the degradation cause 230 in any technically feasible fashion. For example, to determine whether the zone authoritative name server 170 is in a degraded state, the zone authoritative name server 170 could monitor the DNS queries 115 and/or the DNS responses 175 to detect abnormal patterns that are indicative of different degraded states.

Because the zone authoritative name server 170 is in a degraded state, the zone resiliency application 180 generates the ENDSO OPT record 210 that specifies the degradation severity 220 and the degradation cause 230. After the zone authoritative name server 170 generates the DNS response 175 to the DNS query 115, the zone resiliency application 180 attaches the EDNSO OPT record 210 to the DNS response 175. Subsequently, as depicted with the bubble numbered 3, the zone authoritative name server 170 transmits the DNS response 175 and the attached EDNSO OPT record 210 to the recursive resolver 210.

After the recursive resolver 210 receives the DNS response 175 and the attached EDNSO OPT record 210, as depicted with the bubble numbered 4, the resolution resiliency application 130 determines that the EDNSO OPT record 250 is attached to the DNS response 175 and performs one or more mitigation operations based on the information included in the EDNSO OPT record 210. For example, the resolution resiliency application 130 could configure the recursive resolver 120 to reduce the number of DNS queries 115 that the recursive resolver 120 transmits to the zone authoritative name server 170.

In alternate embodiments, the resiliency applications may provide any amount and type of functionality that detect and/or characterize when any number and type of authoritative name servers are in a degraded state. For instance, in some embodiments, if the zone authoritative name server 170 is unavailable, then the zone authoritative name server 170 is unable to generate the DNS response 175, and the zone resiliency application 180 is unable to generate and attach the EDNSO OPT record 210. If the recursive resolver 120 is unable to obtain the DNS response 175 from the zone authoritative name server 170, then the resolution resiliency application 130 transmits an inquiry to the parent zone authoritative name server 150 requesting the status of the zone authoritative name server 170. In response, the parent zone resiliency application 160 specifies the domain name and/or IP address of a third party notification service that is able to provide the status of the zone authoritative name server 170. In alternate embodiments, the resolution resiliency application 130 may obtain the status from one or more other resolution resiliency application(s) 130 associated with one or more other recursive resolver(s) 120 that have previously obtained or determined the status.

In the same or other embodiments, a third party notification service could preemptively transmit a message that indicates that the zone authoritative name server 170 is in a degraded state to the resolution resiliency application 130. The resolution resiliency application 130 could read the message and configure the recursive resolver 120 to perform one or more mitigation operations. In some alternative embodiments, the resolution resiliency application 130 may detect that the zone authoritative name server 170 is in a degraded state based on detecting a pattern in the DNS responses 175 that is indicative of the degraded state. For example, the absence of an expected recurring "keep alive" status indicator in the DNS responses 175 may indicate a degraded state.

Figure 3:
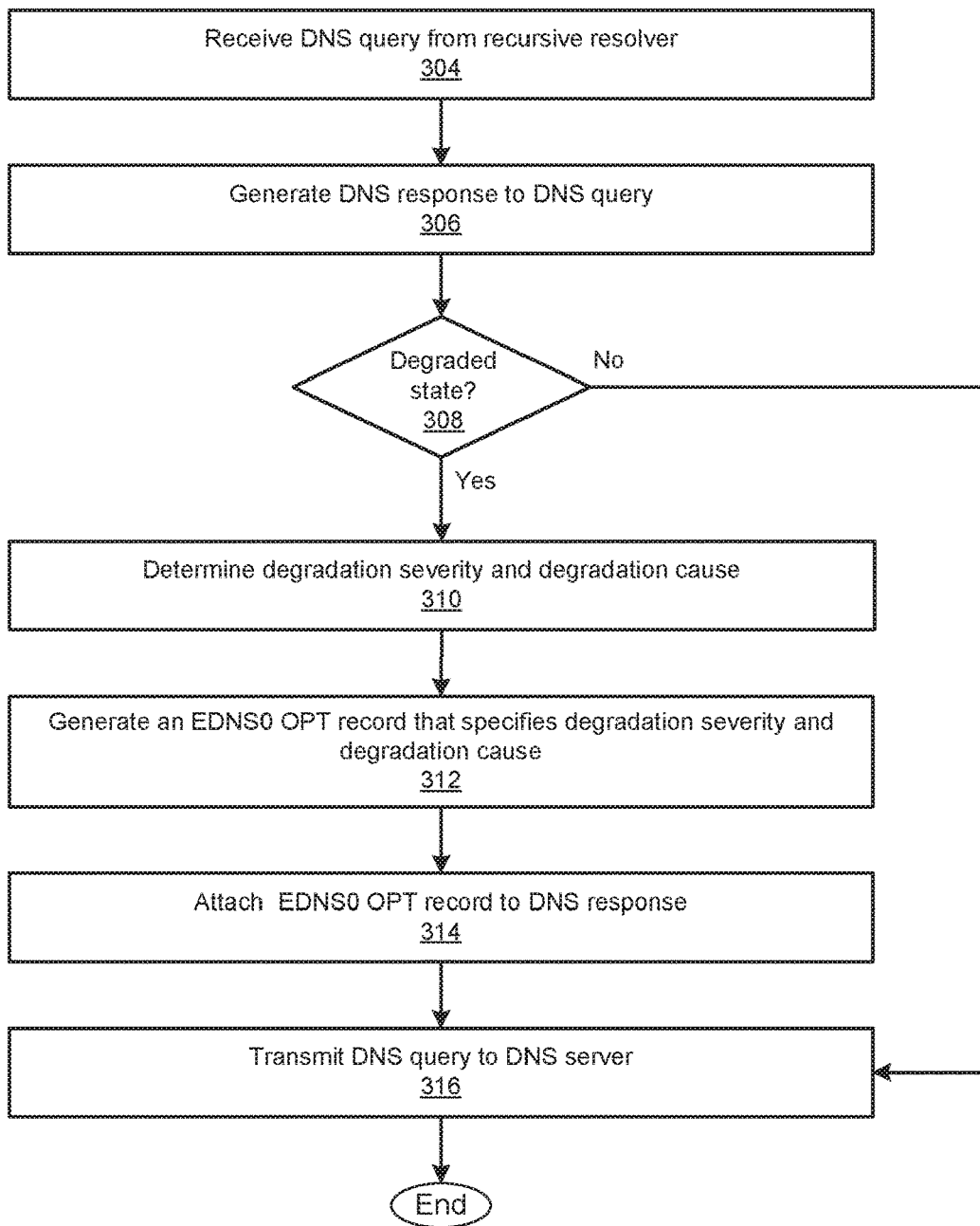
FIG. 3 is a flow diagram of method steps for indicating that an authoritative name server is in a degraded state during DNS resolution, according to various embodiments of the present invention.

FIG. 3 is a flow diagram of method steps for indicating that an authoritative name server is in a degraded state during DNS resolution, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 304, where the zone authoritative name server 170 receives the DNS query 115 from the recursive resolver 120. At step 306, the zone authoritative name server 170 generates the DNS response 175 to the DNS query 115. Notably, as part of step 306, the zone authoritative name server 170 may generate the DNS response 175 based on any number of criteria.

For example, if the zone authoritative name server 170 is in a degraded state, then the zone authoritative name server 170 may evaluate the DNS query 115 to determine whether the DNS query 115 is associated with a high priority. The zone authoritative name server 170 may determine whether the DNS query 115 is associated with a high priority in any technically feasible fashion. For instance, in some embodiments, the zone authoritative name server 170 determines whether the recursive resolver 120 is included in a whitelist.

If the DNS query 115 is associated with the high priority, then the zone authoritative name server 170 may generate the positive DNS response 175 that provides the information requested in the DNS query 115. If, however, the DNS query 115 is not associated with the high priority, then the zone authoritative name server 170 may generate the negative DNS response 175 that specifies a DNS return code indicating an error.

At step 308, the zone resiliency application 180 determines whether the zone authoritative name server 170 is in a degraded state. If, at step 308, the zone resiliency application 180 determines that the zone authoritative name server 170 is in a degraded state, then the method 300 proceeds to step 310. At step 310, the zone resiliency application 180 determines the degradation severity 220 and the degradation cause 230.

At step 312, the zone resiliency application 180 generates an EDNSO OPT record 210 that specifies the degradation severity 220 and the degradation cause 230. At step 314, the zone resiliency application 180 attaches the EDNSO OPT record 210 to the DNS response 175. More specifically, the zone resiliency application 180 generates a DNS message that includes, without limitation, the EDNSO OPT record 210 and the DNS response 175. In alternate embodiments, instead of generating the EDNSO OPT record 210, the zone resiliency application 180 may generate any type of status record that indicates the degraded state and any number (including zero) of characteristics associated with the degraded state. Further, instead of attaching the status record to the DNS response 175, the zone resiliency application 180 may associate the status record with the DNS response 175 in any technically feasible fashion. In such embodiments, the steps 312 and 314 of the method 300 are modified accordingly. If, however, at step 308, the zone resiliency application 180 determines that the zone authoritative name server 170 is not in a degraded state, then the method 300 proceeds directly to step 316.

At step 316, the zone authoritative name server 170 transmits the DNS response 175 and the attached EDNSO OPT 210 record to the recursive resolver 120. The method 300 then terminates. In alternate embodiments, the zone authoritative name server 170 may determine any amount and type of information that characterizes the degraded state. In the same or other alternate embodiments, the zone authoritative name server 170 may associate the information that characterizes the degraded state with the DNS response 175 in any technically feasible fashion.

Mitigating Authoritative Name Server Outages

Figure 4:
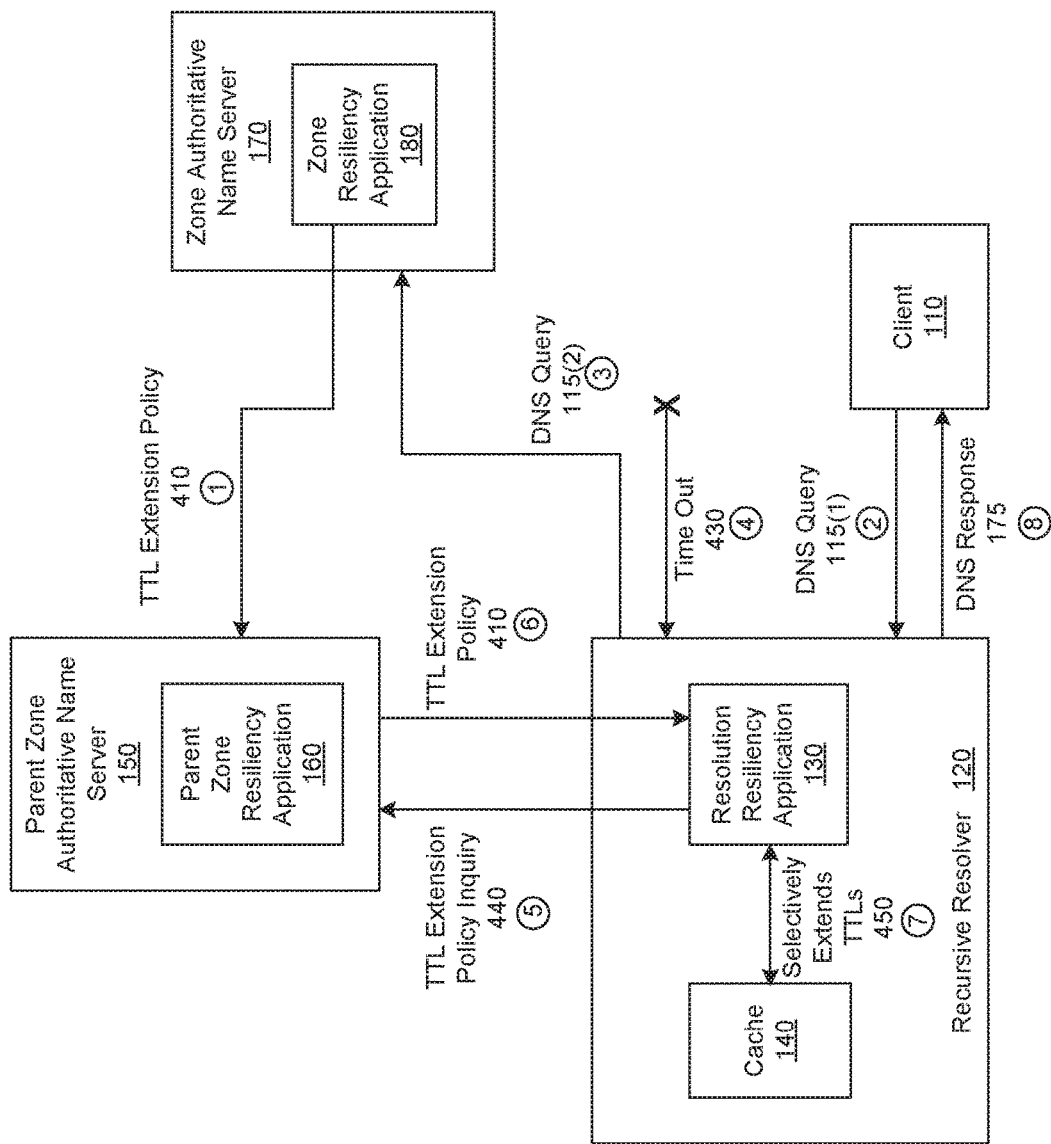
FIG. 4 illustrates a process implemented by the resolution resiliency application of FIG. 1 for directing DNS resolution when the zone authoritative name server is unavailable, according to various embodiments of the present invention.

FIG. 4 illustrates a process implemented by the resolution resiliency application 130 of FIG. 1 for directing DNS resolution when the zone authoritative name server 170 is unavailable, according to various embodiments of the present invention. For explanatory purposes, "outage" refers to any partial or complete degradation in an operation of the zone authoritative name server 170, including when the zone authoritative name server 170 is unavailable.

For explanatory purposes only, FIG. 4 depicts a sequence of events involved in DNS resolution using a series of numbered bubbles. First, as depicted with the bubble numbered 1, the zone resiliency application 180 transmits a TTL extension policy 410 to the parent zone authoritative name server 150. The TTL extension policy 410 may include any amount and type of information that specifies authorized TTL extensions for DNS records associated with the zone for which the zone authoritative name server 170 is responsible.

For example, the TTL extension policy 410 could specify a single duration by which to extend the TTLs. In another example, the TTL extension policy 410 could specify multiple durations by which to extend TTLs, where each duration is associated with one or more DNS records. For explanatory purposes, the TTL extension policy 410 specifies authorized TTL extensions for one or more of the DNS records that are included in the cache 140 of the recursive resolver 120.

Eventually, as depicted with the bubble numbered 2, the client 110 transmits the DNS query 115(1) to the recursive resolver 120. The DNS query 115(1) requests information associated with a domain name that is included in the zone for which the zone authoritative name server 170 is responsible. Upon receiving the DNS query 115(1), the recursive resolver 120 determines that the cache 140 does not include a valid DNS record that enables the recursive resolver 120 to independently provide the requested information. As depicted with the bubble numbered 3, the recursive resolver 120 then transmits the DNS query 115(2) to the zone authoritative name server 170.

At depicted with the bubble numbered 4, the resolution resiliency application 130 determines that the zone authoritative name server 170 is unavailable. The resolution resiliency application 130 may determine that the zone authoritative name server 170 is unavailable in any technically feasible fashion. For example, the transmission of the DNS query 115 may time out 430 for each of multiple attempts. In another example, the recursive resolver 120 may receive the DNS response 175 indicating that the server failed to complete the DNS response 175.

As depicted with the bubble numbered 5, upon detecting that the zone authoritative name server 170 is unavailable, the resolution resiliency application 130 transmits a TTL extension policy inquiry 440 to the parent zone authoritative name server 150. In response, as depicted with the bubble numbered 6, the parent zone authoritative name server 150 transmits the TTL extension policy 410 to the resolution resiliency application 130. As depicted with the bubble numbered 7, the resolution resiliency application 130 determines that the TTL extension policy 410 permits the resolution resiliency application 130 to extend the TTLs of one or more of the DNS records stored in the cache 140. Accordingly, the resolution resiliency application 130 selectively extends TTLs 450 based on the TTL extension policy 410.

In alternate embodiments, the resolution resiliency application 130 may transmit the TTL extension policy inquiry 440 and thereby obtain the TTL extension policy 410 proactively, i.e., prior to detecting that the zone authoritative name server 170 is unavailable. In various embodiments, the zone resiliency application 180 may transmit the TTL extension policy 410 to a third party notification service, and the resolution resiliency application 130 may obtain the TTL extension policy 410 from the third party notification service. In some such embodiments, the TTL extension policy 410 may be implemented as a rule for determining which records in the zone should be returned according to techniques disclosed in the United States Patent Application having Ser. No. 14/252,483 and titled "Computer-Implemented Method, Apparatus, and Computer-Readable Medium For Processing Named Entity Queries Using a Cached Functionality in a Domain Name System."

Notably, the resolution resiliency application 130 extends the TTL of the DNS record required to generate the positive DNS response 175 to the DNS query 115(1) past the current time. The resolution resiliency application 130 then configures the recursive resolver 120 to generate the positive DNS response 175 to the DNS query 115(1) based on the required DNS record stored in the cache 140. Finally, as depicted with the bubble numbered 8, the recursive resolver 120 transmits the DNS response 175 to the client 110, enabling the client 110 to access the domain name specified in the DNS query 115(1) despite the unavailability of the zone authoritative name server 180.

Although not depicted in FIG. 4, in other examples, the resolution resiliency application 130 could determine that the TTL extension policy 410 does not permit the resolution resiliency application 130 to extend the TTL of any of the DNS records stored in the cache 140. In yet other examples, the resolution resiliency application 130 could extend the TTLs of some of the DNS records stored in the cache 140, but not the TTL of the DNS record that enables the recursive resolver 120 to successfully provide the information requested in the DNS query 115(1). In these other examples, the recursive resolver 120 would transmit the DNS response 175 indicating that the server failed to complete the DNS response 175 to the client 110.

In alternate embodiments, the resiliency applications may provide any amount and type of functionality that mitigate an impact on any number of clients 110 when any number and type of authoritative name servers are in a degraded state. For instance, in some embodiments, the resolution resiliency application 130 may configure the recursive resolver 120 to reduce the amount and/or frequency of DNS queries 115 transmitted to an authoritative name server that is degraded. In the same or other embodiments, the zone resiliency application 180 may configure an authoritative name server that is degraded to prioritize the received DNS queries 115.

Further, the resiliency applications may be configured to obtain any number (including zero) and type of "resiliency policies" associated with an authoritative name server in any technically feasible fashion. Each resiliency policy specifies a resolution behavior that may be performed to mitigate the impact on DNS resolution when the associated authoritative name server is in a degraded state. Notably, the TTL extension policy 401 is one example of a resiliency policy that is associated with the zone authoritative name server 170.

In general, the resiliency applications could configure DNS servers to prioritize the received DNS queries 115 in any technically feasible fashion. For instance, in some embodiments, the resiliency applications could configure a DNS server to prioritize the received DNS queries 115 based on a whitelist and/or a blacklist. In the same or other embodiments, the resiliency applications could configure a DNS server to prioritize the received DNS queries 115 based on techniques disclosed in the U.S. Pat. No. 8,990,356 titled "Adaptive Name Resolution."

In some embodiments, if a name server record for the zone authoritative name server 170 is included in the cache 140 expires and the parent zone authoritative name server 150 is unavailable, then the resolution resiliency application 130 may use the stale name server records to map to an "old" zone authoritative name server 170. Subsequently, the resolution resiliency application 130 may contact the old zone authoritative name server 170 to determine whether the name server records are still valid, or to obtain new name server records for the new zone authoritative name server 170, e.g., a "forwarding pointer" from the old to the new. The name server records may be accompanied with DNSSEC signatures for additional assurance of their integrity. As such, it is sufficient for an old zone authoritative name server 170 to be available in order for the recursive resolver 130 to locate the new zone authoritative name server 170, even though the parent zone authoritative name server 150, which would normally have the new name server records, is unavailable.

In various embodiments, the resolution resiliency application 130 may extract DNS records from the caches of other co-operating recursive resolvers 120 when one or more authoritative name servers are in degraded states. In some such embodiments, the resolution resiliency application 130 may determine a "source" cache based on a "copying policy" associated with a degraded authoritative name server. The copying policy is a type of resiliency policy that indicates an alternate cache or source for DNS records.

In various embodiments, the resolution resiliency applications 130 could implement techniques disclosed in the United States Patent Application having Ser. No. 15/221,867 and titled "Strengthening Integrity Assurances for DNS Data" to obtain relevant DNS records from other co-operating recursive resolvers 120 or other witnesses, including block chains and public ledgers, and/or to mitigate the impact of expiration of DNSSEC signatures on DNS records of interest. The other recursive resolvers 120 or witnesses may be optimized for certain types of queries, e.g., for specific parts of a zone, and/or for access during an outage.

In various embodiments, the resiliency applications could populate a backup cache or data source when authoritative name servers are not degraded. Subsequently, the resiliency applications could access the backup cache or data source when authoritative name servers are degraded. Any number of the resiliency applications could provide backup cache or data source functionality in any technically feasible fashion. For example, one or more of the resiliency applications could implement techniques disclosed in the United States Patent Application having Ser. No. 13/118,039 and titled "Recovery of a Failed Registry."

In some embodiments, the parent zone resiliency application 160 and/or the zone resiliency application 180 could implement bifurcated authoritative service. In "bifurcated authoritative service," the resiliency applications configure parent zone authoritative name servers 150 to provide different sets of authoritative name server records and/or name server IP addresses to different recursive resolvers 120 based on predetermined criteria. For example, the resiliency applications could configure a preferred set of recursive resolvers 120 to use zone authoritative name servers 170 that are unlikely to experience degradation. By contrast, the resiliency applications could configure the remaining recursive resolvers 120 to use zone authoritative name servers 170 that are generally accessible and more likely to experience degradation.

Any number of the resiliency applications could provide bifurcated authoritative service functionality in any technically feasible fashion. For example, one or more of the resiliency applications could implement techniques disclosed in the U.S. Pat. No. 8,990,356 titled "Adaptive Name Resolution." The same or other resiliency applications could implement techniques disclosed in the United States Patent Application having Ser. No. 15/221,867 and titled "Strengthening Integrity Assurances for DNS Data."

In general, each of the resiliency applications may be configured to perform one or more mitigation operations without necessarily performing any number of additional mitigation operations. For example, the resolution resiliency application 130 could include functionality to extract DNS records from the caches of other co-operating recursive resolvers 120, but omit functionality to extend TTLs of stale DNS records.

Figure 5:
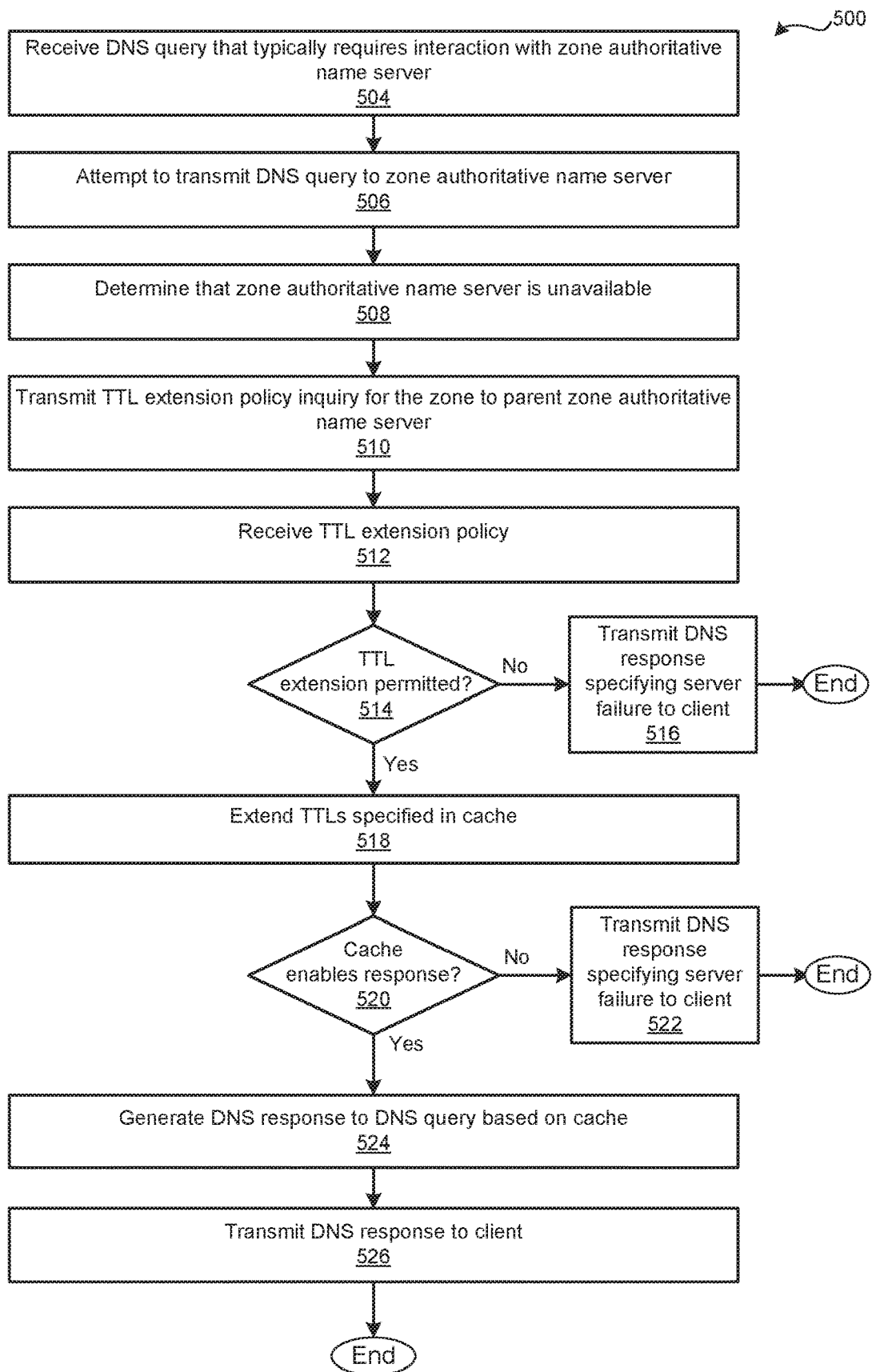
FIG. 5 is a flow diagram of method steps for performing DNS resolution when an authoritative name server is unavailable, according to various embodiments of the present invention.

FIG. 5 is a flow diagram of method steps for performing DNS resolution when an authoritative name server is unavailable, according to various embodiments of the present invention. Although the method steps are described with reference to the systems of FIGS. 1 and 4, persons skilled in the art will understand that any system configured to implement the method steps, in any order, falls within the scope of the present invention.

As shown, a method 500 begins at step 504, where the recursive resolver 120 receives the DNS query 115 from the client 110. Notably, the DNS query 115 typically requires interaction with the zone authoritative name server 170. More specifically, the DNS query 115 involves a DNS record that is managed by the zone authoritative name server 170, and the cache 140 does not include a valid copy of the DNS record.

At step 506, the recursive resolver 120 attempts to transmit the DNS query 115 to the zone authoritative name server 170. At step 508, the resolution resiliency application 130 determines that the zone authoritative name server 170 is unavailable. The resolution resiliency application 130 may determine that the zone authoritative name server 170 is unavailable in any technically feasible fashion. For example, the transmission of the DNS query 115 may time out for each of multiple attempts. In another example, the recursive resolver 120 may receive the DNS response 175 indicating that the server failed to complete the DNS response 175.

At step 510, the resolution resiliency application 130 transmits the TTL extension policy inquiry 440 to the parent zone authoritative name server 150. At step 512, the resolution resiliency application 130 receives the TTL extension policy 410 from the parent zone authoritative name server 150. At step 514, the resolution resiliency application 130 determines whether the TTL extension policy 410 permits the resolution resiliency application 130 to extend the TTLs of DNS records stored in the cache 140.

If, at step 514, the resolution resiliency application 130 determines that the TTL extension policy 410 does not permit the resolution resiliency application 130 to extend the TTL of any of the DNS records stored in the cache 140, then the method 500 proceeds to step 516. At step 516, the recursive resolver 120 transmits the DNS response 175 indicating that the server failed to complete the DNS response 175 to the client 110. The method 500 then terminates.

If, however, at step 514, the resolution resiliency application 130 determines that the TTL extension policy 410 permits the resolution resiliency application 130 to extend a TTL of at least one DNS record stored in the cache 140, then the method 500 proceeds directly to step 518. At step 518, the resolution resiliency application 130 extends the TTLs of the DNS records stored in the cache 140 as per the TTL extension policy 410. The resolution resiliency application 130 may extend the TTLs in any technically feasible fashion. For example, the resolution resiliency application 180 could add a fixed amount of time to the TTL of the DNS records stored in the cache 140 that are associated with the zone for which the zone authoritative name server 170 is responsible. In various embodiments, the fixed amount of time may be specified in the TTL extension policy 410.

In alternate embodiments, the resiliency applications could populate a backup cache when the zone authoritative name servers 170 is not degraded. If, at step 508, the resolution resiliency application 130 determines that the zone authoritative name server 170 is unavailable, then the resolution resiliency application 130 could access the backup cache instead of or in addition to performing steps 510-518.

At step 520, the resolution resiliency application 130 determines whether required DNS record is stored in the cache 140 and the TTL of the required DNS record now indicates that the required DNS record is valid. If at step 520, the resolution resiliency application 130 determines that the required DNS record is not stored in the cache 140 or the TTL of the required DNS record indicates that the required DNS record is stale, then the method 500 proceeds to step 522. At step 522, the recursive resolver 120 transmits the DNS response 175 indicating that the server failed to complete the DNS response 175 to the client 110. The method 500 then terminates.

If, however, at step 520, the resolution resiliency application 130 determines that the required DNS record is stored in the cache 140 and the TTL of the required DNS record now indicates that the required DNS record is valid, then the method 500 proceeds directly to step 524. At step 524, the resolution resiliency application 130 configures the recursive resolver 120 to generate the DNS response 175 to the DNS query 115 based on the required DNS record stored in the cache 140. Advantageously, the DNS response 175 may successfully provide the information requested in the DNS query 115. At step 526, the recursive resolver 120 transmits the DNS response 175 to the client 110, and the method 500 terminates.

Referring back to FIG. 1, the system 100 may optionally include any number of resiliency orchestrators 190. In various embodiments, each of the resiliency orchestrators 190 may communicate with any number and combination of the resolution resiliency applications 130, the zone resiliency applications 180, and the parent zone resiliency applications 160. In general, the resiliency orchestrator 190 indicates that the authoritative name server for a zone is in or may soon be in a degraded state and provides zone data that can be used to pre-provision the resiliency applications. The zone data provides sufficient information to redirect the recursive resolver 120.

One example of how the resiliency orchestrator 190 could be implemented is as a shadow master that provides zone transfers to the resolution resiliency applications 130. In such an example, the resolution resiliency application 130 could be implemented as an authoritative name server (or functionality within the recursive resolver 120 that offers authoritative name service). In another example, consider a zone ".example" for which name servers are hosted in a different zone "nameservers.example.net." The DNS responses 175 from the parent zone for ".example" would include name server (NS) records pointing to entries in "nameservers.example.net." If the authoritative name servers for ".example" are degraded, then the resolution resiliency application 130 is authoritative for the zone "nameservers.example.net." The resiliency orchestrator 190 could provide zone information to the resolution resiliency application 130 that provides alternate information for DNS records in the zone "nameservers.example.net." Further, the alternate information could be tailored by the zone operator to direct different recursive resolvers 120 to different name servers based on policy decisions.

Recovering From Authoritative Name Server Outages and Errors

Figure 6:
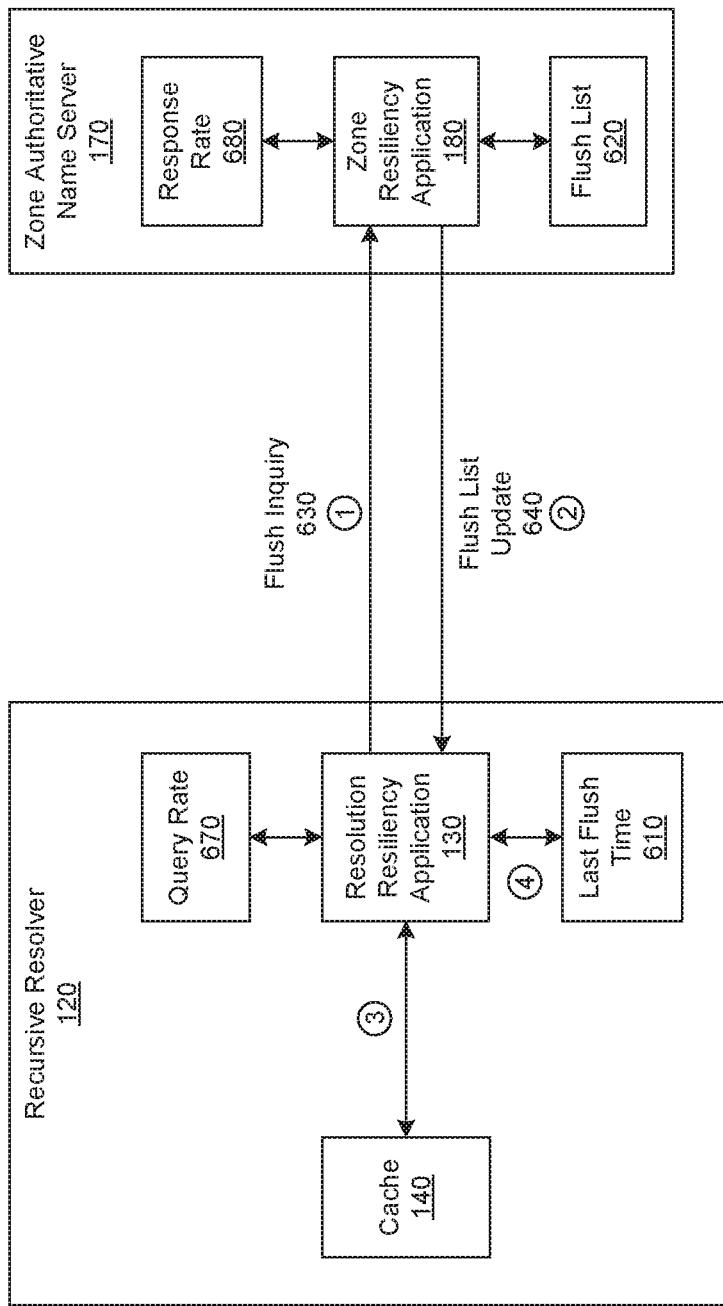
FIG. 6 illustrates a process implemented by the resolution resiliency application of FIG. 1 for modifying DNS resolution when the zone authoritative name server is recovering from a degraded state, according to various embodiments of the present invention.

FIG. 6 illustrates a process implemented by the resolution resiliency application 130 of FIG. 1 for modifying DNS resolution when the zone authoritative name server 170 is recovering from a degraded state, according to various embodiments of the present invention. As shown, the zone authoritative name server 170 includes, without limitation, a flush list 620 and a response rate 680. As also shown, the recursive resolver 120 includes, without limitation, a last flush time 610 and a query rate 670. The resiliency applications may determine whether the zone authoritative name server 170 is recovering from a degraded state in any technically feasible fashion.

For example, the resolution resiliency application 130 could determine a state of the zone authoritative name server 170 based on EDNSO OPT records attached to the DNS response 175 received from the zone authoritative name server 170. In another example, the resolution resiliency application 130 could estimate a state of the zone authoritative name server 170 based on patterns in the DNS responses 175 that the recursive resolver 120 receives from the zone authoritative name server 170. In a similar fashion, the zone resiliency application 180 could determine that the zone authoritative name server 170 is likely degraded based on an abnormal rate at which the zone authoritative name server 170 receives the DNS queries 115 from the recursive resolvers 120.

As referred to herein, the zone authoritative name server 170 is considered to be recovering from a degraded state when functionality of the zone authoritative name server 170 has recently been compromised and/or any DNS records associated with a zone for which the zone authoritative name server 170 is responsible include or have recently included erroneous information. For example if the zone authoritative name server 170 has recently been offline, then the resiliency applications could consider the zone authoritative name server 170 to be recovering from a degraded state. In another example, if a different authoritative name server could have recently propagated invalid DNS records associated with the zone, then the resiliency applications could consider the zone authoritative name server 170 to be recovering from a degraded state.

In operation, the zone resiliency application 180 configures the flush list 620 to specify invalid DNS records for which the zone authoritative name server 170 is responsible and that the zone authoritative name server 170 or other authoritative name servers may have propagated to one or more of the recursive resolvers 120. As referred to herein, "invalid DNS records" include incorrect data, such as an incorrect Internet Protocol (IP) addresses. For each of the invalid DNS records specified in the flush list 620, the zone resiliency application 180 also specifies a time stamp that indicates a time at which the zone authoritative server 180 ceased propagating the invalid data. In general, the zone resiliency application 180 may identify invalid DNS records and specify associated time stamps in any technically feasible fashion. For example, the zone resiliency application 180 may receive a signal from the owner of a domain name that indicates that a DNS record associated with the domain name is invalid.

In another example, after the zone resiliency application 180 begins recovering from a degraded state during which the zone authoritative name server 170 propagated invalid DNS records, the zone resiliency application 180 could add the invalid DNS records to the flush list 620. Further, for each invalid DNS record, the zone resiliency application 180 could set the associated time stamp equal to a time at which the zone authoritative name server 170 started to recover from the degraded state. Notably, for a given DNS record included in the flush list 620, when a current time exceeds the sum of the associated time stamp and the associated TTL, the zone resiliency application 180 removes the DNS record from the flush list 620.

In a complementary fashion, the last flush time 610 specifies a last time at which the resolution resiliency application 130 flushed DNS records associated with the zone authoritative name server 170 from the cache 140. In various embodiments, the resolution resiliency application 130 maintains different last flush times 610 that are associated with different authoritative name servers. Initially, the resolution resiliency application 130 sets the last flush time 610 equal to the current time.

Periodically (e.g., at a predetermined interval), the resolution resiliency application 130 performs a cache flushing process. For explanatory purposes only, FIG. 6 depicts a sequence of events involved in the cache flushing process using a series of numbered bubbles. First, as depicted with the bubble numbered 1, the resolution resiliency application 130 transmits a flush inquiry 630 that specifies the last flush time 610 to the zone resiliency application 180.

The zone resiliency application 180 evaluates the flush list 620 in conjunction with the last flush time 610 to generate a flush list update 640. The flush list update 640 specifies any DNS records that the zone resolution application 180 has identified as invalid since the last flush time 610. More precisely, for each of the DNS records included in the flush list 620, the zone resiliency application 180 compares the associated time stamp to the last flush time 610. If the time stamp is later than the last flush time 610, then the zone resiliency application 180 includes the DNS record in the flush list update 640. If, however, the time stamp is not later than the last flush time 610, then the zone resiliency application does not include the DNS record in the flush list update 640.

As depicted with the bubble numbered 2, the zone resiliency application 180 then transmits the flush list update 640 to the resolution resiliency application 130. Upon receiving the flush list update 640 and as depicted with the bubble numbered 3, the resolution resiliency application 130 removes any DNS records that are specified in the flush list update 640 from the cache 140. Finally, as depicted with the bubble numbered 4, the resolution resiliency application 130 sets the last flush time 610 equal to the current time.

In alternate embodiments, the resolution resiliency application 130 may configure the zone resiliency application 180 to transmit the flush list update 640 to the resolution resiliency application 130 in any technically feasible fashion and based on any criterion. For example, initially, the resolution resiliency application 180 could transmit a flush configuration request to the zone resiliency application 180. The flush configuration request could request that the zone resiliency application 180 transmit the flush list update 640 to the resolution resiliency application 130 whenever the zone resiliency application 130 updates the flush list 620. Subsequently, upon updating the flush list 620, the zone resiliency application 130 could send the flush list update 640 to the resolution resiliency application 130 without receiving any additional inquiries from the recursive resolver 120.

In various embodiments, the query rate 670 specifies a rate at which the resolution resiliency application 130 configures the recursive resolver 120 to transmits the DNS queries 115 to the zone authoritative name server 170. Initially, the resolution resiliency application 130 sets the query rate 670 to an unlimited query value specifying that the rate at which the resolution resiliency application 130 transmits DNS queries 115 to the recursive resolver 120 is unlimited. While the zone authoritative name server 170 is recovering from a degraded state, the resolution resiliency application 130 reduces the query rate 670 and then gradually restores the query rate 670 to the unlimited query value. The resolution resiliency application 130 may determine the query rate 670 in any technically feasible fashion. For instance, in some embodiments, the resolution resiliency application 130 may set the query rate 670 based on a time elapsed since the zone authoritative name server 170 started to recover from the degraded state.

In various embodiments, the response rate 680 specifies a rate at which the zone authoritative name server 170 responds to the DNS queries 115 from one or more recursive resolvers 130 based on DNS records. More precisely, if the zone authoritative name server 170 receives DNS queries 115 at a higher rate than the response rate 680, then the zone resiliency application 180 rejects the DNS query 115. As referred to herein, "rejecting" the DNS query 115 refers to responding the DNS query 115 with the negative DNS response 185 specifying a DNS return code that indicates a server error. By contrast, "accepting" the DNS query 115 refers to responding to the DNS query 115 based on DNS records. The zone resiliency application 180 may adjust the response rate 680 in any technically feasible fashion and based on any number and type of criteria.

For instance, in some embodiments, the zone resiliency application 180 sets the response rate 680 to an unlimited response value specifying that the rate at which the zone authoritative name server 170 accepts the DNS queries 115 is unlimited. While the zone authoritative name server 170 is recovering from a degraded state, the zone resiliency application 180 reduces the response rate 680 and then gradually restores the response rate 680 to the unlimited response value. The zone resiliency application 180 may determine the response rate 680 in any technically feasible fashion. For instance, in some embodiments, the zone resiliency application 180 may determine the response rate 680 based on a time elapsed since the zone authoritative name server 170 started to recover from the degraded state.

In alternate embodiments, the zone resiliency application 180 may determine whether to accept the DNS query 115 based on any number and type of response modifiers in any technically feasible fashion. For instance, in some embodiments, the zone resiliency application 180 identifies a whitelist that specifies DNS servers that are associated with a high priority. Upon receiving the DNS query 115 while the zone authoritative name server 170 is recovering from a degraded state, the zone resiliency application 180 determines whether the DNS query 115 is associated with a high priority. If the DNS query 115 is associated with a high priority, then the zone authoritative name server 170 generates the DNS responses 175 based on DNS records. If, however, the DNS query 115 is not associated with a high priority, then the zone resiliency application 180 generates the negative DNS response 175 specifying a DNS return code that indicates a server error.

Advantageously, by periodically and selectively flushing the cache 140, the resiliency applications reduce errors in DNS resolution attributable to invalid DNS records associated with a degradation of the zone authoritative name server 170. For example, suppose that the zone authoritative name server 170 is recovering from an outage attributable to correcting an operator error that caused the zone authoritative name server 170 to propagate invalid DNS records to the recursive resolver 120. In such a scenario, the resiliency applications could collaborate to flush the invalid DNS records from the cache 140. Further, by strategically reducing the rate of the DNS queries 115 and/or the rate of the DNS responses 175, the resiliency applications reduce the likelihood of overwhelming the zone authoritative name server 170 as the zone authoritative name server 170 recovers from a degraded state.

In alternate embodiments, the resiliency applications may provide any amount and type of functionality that enable any number of authoritative name servers to effectively recover from a degraded state. For instance, in various embodiments, one or more of the resiliency applications could populate a backup cache when authoritative name servers are not degraded or when an authoritative name server is recovering from a degradation. In such embodiments, one or more of the resiliency applications could subsequently access the backup cache to reduce the number of DNS queries 115 transmitted to an authoritative name server that is recovering from a degradation. As described above in conjunction with FIG. 5, any number of the resiliency applications could provide backup cache functionality in any technically feasible fashion.

In general, each of the resiliency applications may be configured to perform one or more recovery operations without necessarily performing any number of additional recovery operations. For example, the resolution resiliency application 130 could include functionality to set and/or adjust the query rate 670, but omit functionality to flush the cache 140 based on the flush list update 640. In another example, the resolution resiliency application 130 could include functionality to flush the cache 140 based on the flush list update 640, but omit functionality to set and/or adjust the query rate 670. In some embodiments, the zone resiliency application 180 may include functionality to set and/or adjust the response rate 680, but omit functionality associated with the flush list update 620. In some other embodiments, the zone resiliency application 180 may include functionality associated with the flush list 620, but omit functionality to set and/or adjust the response rate 680.

Figure 7:
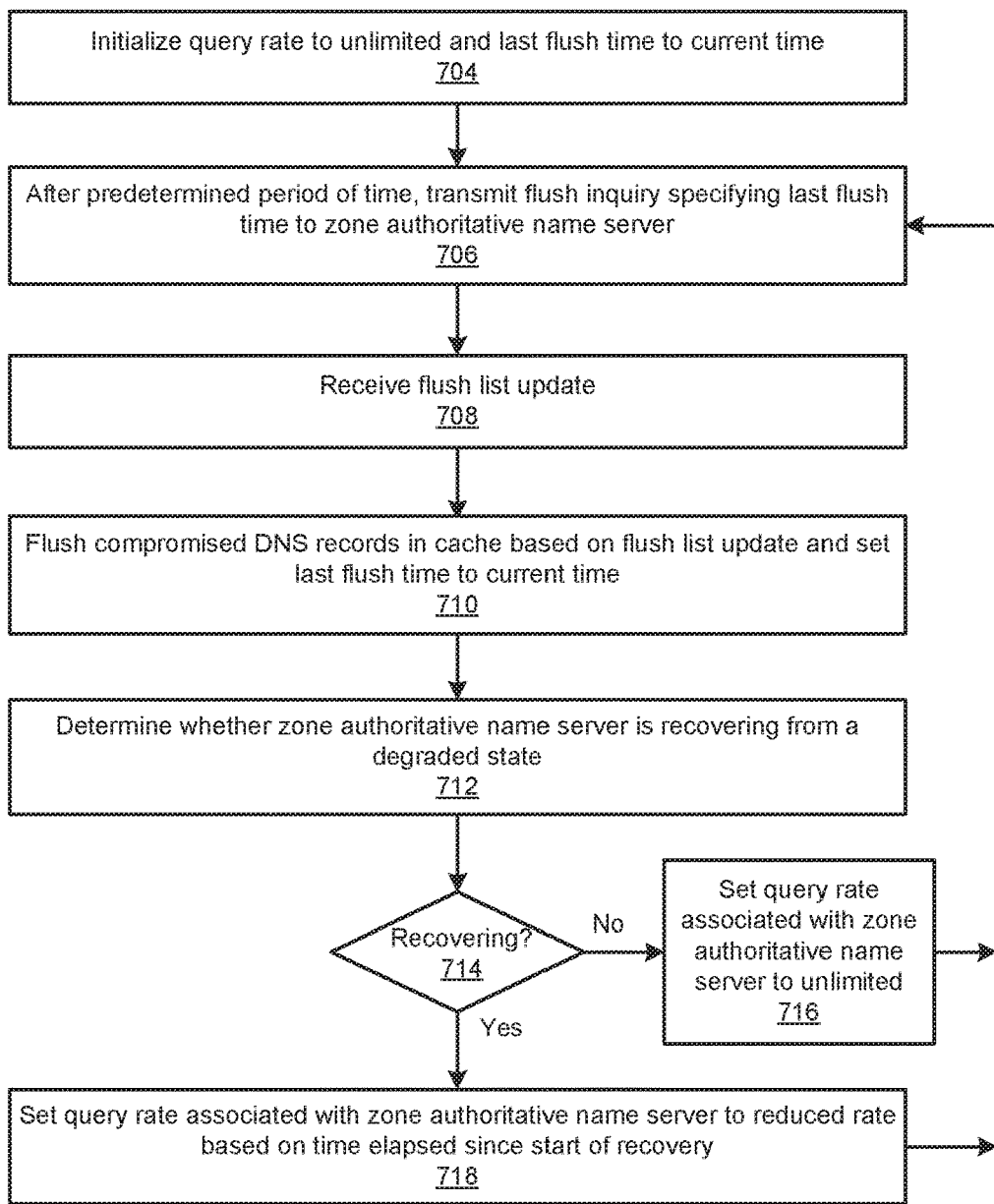
FIG. 7 is a flow diagram of method steps for modifying DNS resolution when an authoritative name server is recovering from a degraded state, according to various embodiments of the present invention.

FIG. 7 is a flow diagram of method steps for modifying DNS resolution when an authoritative name server is recovering from a degraded state, according to various embodiments of the present invention. Although the method steps are described with reference to the systems of FIGS. 1 and 6, persons skilled in the art will understand that any system configured to implement the method steps, in any order, falls within the scope of the present invention.

As shown, a method 700 begins at step 704, where the resolution resiliency application 130 initializes the query rate 670 and the last flush time 610. In general, the resolution resiliency application 130 initializes the query rate 670 to the unlimited query value indicating that the rate at which the recursive resolver 120 transmits the DNS queries 115 to the zone authoritative name server 170 is unlimited. The resolution resiliency application 130 initializes the last flush time 610 to the current time. At step 706, after a predetermined amount of time has elapsed, the resolution resiliency application 130 transmits the flush inquiry 630 to the zone resiliency application 180. The flush inquiry 630 specifies the last flush time 610.

At step 708, the resolution resiliency application 130 receives the flush list update 640 from the zone resiliency application 180. The flush list update 640 specifies the DNS records that are managed by the zone authoritative name server 170 that the zone resiliency application 180 has identified as invalid since the last flush time 610. In some embodiments, the flush list update 640 omits any DNS records that are stale (i.e., the current time exceeds the sum of the time stamp associated with the DNS record and the TTL associated with the DNS record). At step 710, the resolution resiliency application 130 identifies and deletes any invalid DNS records that are stored in the cache 140 as per the flush list update 640. The resolution resiliency application 130 then sets the last flush time 610 equal to the current time.

At step 712, the resolution resiliency application 130 determines whether the zone authoritative name server 170 is recovering from a degraded state. The resolution resiliency application 130 may determine whether the zone authoritative name server 170 is recovering from a degraded state in any technically feasible fashion. For example, the resolution resiliency application 130 could determine that the zone authoritative name server 170 is recovering from a degraded state based on detecting an increase in a number or rate of positive DNS responses 175 received from the zone authoritative name server 170.

If, at step 714, the resolution resiliency application 130 determines that the zone authoritative name server 170 is recovering from a degraded state, then the method 700 proceeds to step 716. At step 716, the resolution resiliency application 130 sets the query rate 670 to the unlimited query value. The method 700 then returns to step 706 where, after a predetermined amount of time, the resolution resiliency application 130 transmits a new flush inquiry 630 to the zone authoritative name server 170.

If, however, at step 714, the resolution resiliency application 130 determines that the zone authoritative name server 170 is not recovering from a degraded state, then the method 700 proceeds directly to step 718. At step 718, the resolution resiliency application 130 sets the query rate 670 based on the time elapsed since the zone authoritative name server 170 started to recover from the degraded state. The method 700 then returns to step 706 where, after a predetermined amount of time, the resolution resiliency application 130 transmits a new flush inquiry 630 to the zone resiliency application 180.

Figure 8:
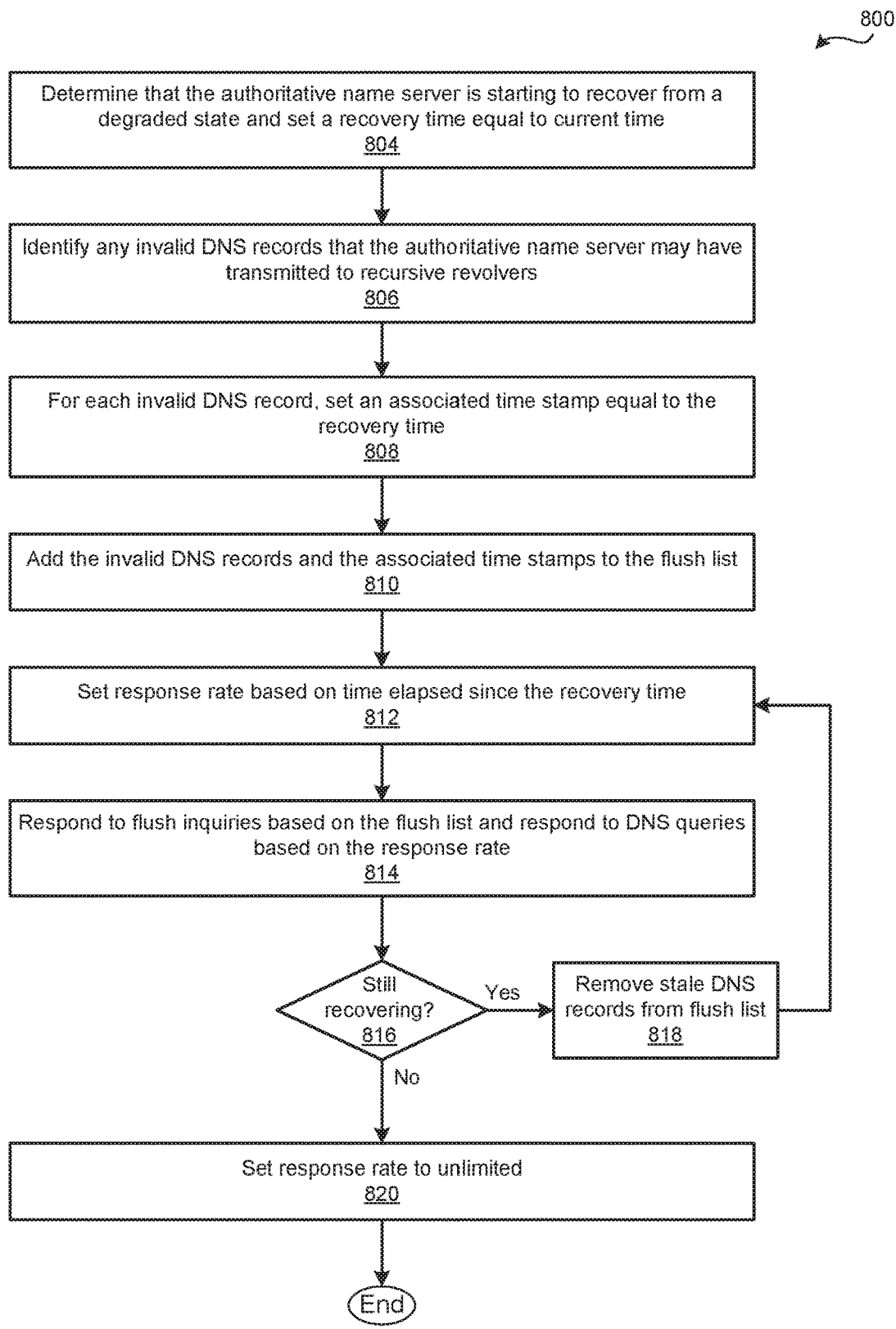
FIG. 8 is a flow diagram of method steps for responding to requests received by an authoritative name server when the authoritative name server is recovering from a degraded state, according to various embodiments of the present invention.

FIG. 8 is a flow diagram of method steps for responding to requests received by an authoritative name server when the authoritative name server is recovering from a degraded state. Although the method steps are described with reference to the systems of FIGS. 1 and 6, persons skilled in the art will understand that any system configured to implement the method steps, in any order, falls within the scope of the present invention. As referred to herein, a "request" includes any transmission to the authoritative name server that solicits information. Examples of a request include the DNS query 115 and the flush inquiry 630.

As shown, a method 800 begins at step 804, where the zone resiliency application 180 determines that the zone authoritative name server 170 is starting to recover from a degraded state and sets a recovery time equal to a current time. The zone resiliency application 180 may determine that the zone authoritative name server 170 is starting to recover from a degraded state in any technically feasible fashion. For example, the zone resiliency application 180 could monitor the rate at which the DNS queries 115 are received by the zone authoritative name server 170.

At step 806, the zone resiliency application 180 identifies any invalid DNS records that the zone authoritative name server 170 may have propagated to one or more of the recursive resolvers 120. The zone resiliency application 180 may identify the invalid DNS records in any technically feasible fashion. For example, the zone resiliency application 180 could determine that an operator error resulted in one or more invalid DNS records that the operator subsequently corrected while the zone authoritative name server 170 was in the degraded state.

At step 808, for each of the invalid DNS records, the zone resiliency application 180 sets an associated time stamp equal to the recovery time. At step 810, the zone resiliency application 180 adds the invalid DNS records and the associated time stamps to the flush list 620. At step 812, the zone resiliency application 180 sets the response rate 680 based on the time elapsed since the recovery time. In general, at the recovery time, the zone resiliency application 180 sets the response rate 680 to a relatively low value. As the time elapsed since the recovery time increases, the zone resiliency application 180 increases the response rate 680. In this fashion, the zone resiliency application 180 configures the zone authoritative name server 170 to gradually warm up.

At step 814, the zone resiliency application 180 responds to the flush inquiries 630 based on the flush list 620 and the DNS queries 115 based on the response rate 680. For each flush inquiry 630, the zone resiliency application 180 generates the flush list update 640 that includes any DNS records in the flush list 620 that specify time stamps later than the last flush time 610 specified in the flush inquiry 630. For each DNS query 115, the zone resiliency application 180 determines whether to accept or reject the DNS query 115 based on the response rate 680.

In alternate embodiments, the zone resiliency application 180 may determine whether to accept or reject each DNS query 115 based on any number and type of response modifiers in any technically feasible fashion. For example, the response modifiers could include a prioritization criterion that specifies a whitelist of preferred DNS servers. If the recursive resolver 120 is included in the whitelist, then the zone authoritative name server 170 responds to the DNS query 115 based on DNS records. If, however, the recursive resolver 120 is not included in the whitelist, then the zone resiliency application 180 returns the negative DNS response 175 specifying a DNS return code that indicates a server error.

At step 816, the zone resiliency application 180 determines whether the zone authoritative name server 170 is still recovering from a degraded state. If, at step 816, the zone resiliency application 180 determines that the zone authoritative name server 170 is still recovering from a degraded state, then the method 800 proceeds to step 818. At step 818, the zone resiliency application 180 removes any stale DNS records from the flush list 620. For each DNS record in the flush list 620, the zone resiliency application 180 determines whether the DNS record is stale based on comparing the current time to the sum of the associated time stamp and the associated TTL. The method 800 then returns to step 812, where the zone resiliency application 180 sets the response rate 180 based on the time elapsed since the recovery time.

If, however, at step 816, the zone resiliency application 180 determines that the zone authoritative name server 170 has finished recovering from a degraded state, then the method 800 proceeds directly to step 820. At step 820, the zone resiliency application 180 sets the response rate 680 to an unlimited response value specifying that the rate at which the zone authoritative name server 170 accepts the DNS queries 115 is unlimited. The method 800 then terminates.

In sum, the disclosed techniques enable DNS resolution that is resilient to reductions in the performance (including outages) of authoritative name servers. More specifically, techniques are described for detecting when an authoritative name server is in a degraded state, reducing negative impacts while an authoritative name server is in a degraded state, and effectively performing DNS resolution as an authoritative name server recovers from a degraded state. In various embodiments, any number of the disclosed techniques may be implemented in any combination.

In some embodiments, a zone resiliency application included in an authoritative name server that is in a degraded state but is still responding to DNS queries provides information regarding the degraded state. In operation, upon receiving a DNS query from a recursive resolver, the zone resiliency application generates an EDNSO OPT record that specifies the severity and cause of the degraded state. The zone resiliency application then attaches the EDNSO OPT record record to a DNS response generated by the zone authoritative name server. Finally, the zone authoritative name server transmits the DNS response and the attached EDNSO OPT record to the recursive resolver.

In the same or other embodiments, if a recursive resolver is unable to obtain mappings to IP addresses from an authoritative name server that is in a degraded state, then a resolution resiliency application attempts to mitigate the impact on the clients. In operation, the resolution resiliency application transmits a time-to-live (TTL) retention policy inquiry to a corresponding parent zone authoritative name server. After receiving the TTL retention policy from the parent zone authoritative name server, the resolution resiliency application extends the TTLs of DNS records in a cache associated with the recursive resolver based on the TTL retention policy.

In some embodiments, to reduce the likelihood that the recursive resolver performs DNS resolution based on invalid DNS records, the zone resiliency application maintains a flush list that specifies DNS records that are invalid. The resolution resiliency application periodically transmits flush inquiries to the zone resiliency application. In response, the resolution resiliency application receives a flush list update that specifies DNS records that the zone resiliency application has identified as invalid. The resolution resiliency application then flushes any stored and invalid DNS records from the cache.

Advantageously, by increasing the resiliency of DNS resolution, DNS servers may enable clients to effectively access Internet resources when one or more authoritative name services are in degraded states. Notably, authoritative name servers may provide information that enable recursive resolvers to mitigate the negative impacts of degraded authoritative name servers on clients in an approved and informed fashion. By contrast, in conventional approaches to DNS resolution when authoritative name servers are in degraded states, recursive resolvers typically operate in a less effective, unilateral and uninformed fashion that may increase the use of invalid DNS records.

1. In some embodiments, a method for performing domain name system (DNS) resolution comprises determining that a first authoritative name server that is responsible for a domain name specified in a first DNS query is unavailable; in response to determining that the first authoritative name server is unavailable, performing one or more operations on a first cache based on one or more resiliency policies associated with the first authoritative name server to modify the first cache, wherein the first cache is used to store DNS records; and generating a first DNS response to the first DNS query based on a first DNS record stored in the modified first cache.

2. The method of clause 1, wherein the one or more resiliency policies include a time-to-live (TTL) extension policy associated with the first authoritative name server, and performing the one or more operations comprises obtaining the TTL extension policy from a second authoritative name server; and extending an expired TTL associated with a stale DNS record stored in the first cache based on the TTL extension policy.

3. The method of clauses 1 or 2, wherein the first authoritative name server is associated with a first zone and the second authoritative name server is associated with a second zone, wherein the second zone is a parent of the first zone.

4. The method of any of clauses 1-3, wherein obtaining the TTL extension policy comprises transmitting an inquiry to the second authoritative name server to request the TTL extension policy associated with the first authoritative name server; and receiving the TTL extension policy from the second authoritative name server.

5. The method of any of clauses 1-4, wherein extending the expired TTL comprises determining that the TTL extension policy permits a first extension of the stale DNS record, and performing an addition operation between the expired TTL and the first extension to generate an extended TTL that is associated with the first DNS record.

6. The method of any of clauses 1-5, wherein the first DNS record comprises an address record, a text record, a service record, or a name server record.

7. The method of any of clauses 1-6, wherein the one or more resiliency policies include a copying policy associated with the first authoritative name server, and performing the one or more operations comprises copying the first DNS record from a second cache indicated via the copying policy to the first cache.

8. The method of any of clauses 1-7, wherein the first authoritative name server is unavailable if: a time out occurs when the first DNS query is transmitted to the first authoritative name server, or a negative response indicating a server error is received when the first DNS query is transmitted to the first authoritative name server.

9. In some embodiments, a computer-readable storage medium including instructions that, when executed by a processor, configure the processor to perform the steps of determining that a first authoritative name server that is responsible for a domain name specified in a first DNS query is unavailable; in response to determining that the first authoritative name server is unavailable, performing one or more operations based on one or more resiliency policies associated with the first authoritative name server to modify the first cache, wherein the first cache is used to store DNS records; and generating a first DNS response to the first DNS query based on a first DNS record stored in the modified first cache.

10. The computer-readable storage medium of clause 9, wherein the one or more resiliency policies include a time-to-live (TTL) extension policy associated with the first authoritative name server, and performing the one or more operations comprises obtaining the TTL extension policy from a second authoritative name server; and extending an expired TTL associated with a stale DNS record stored in the first cache based on the TTL extension policy.

11. The computer-readable storage medium of clauses 9 or 10, wherein obtaining the TTL extension policy comprises transmitting an inquiry to the second authoritative name server to request the TTL extension policy associated with the first authoritative name server; and receiving the TTL extension policy from the second authoritative name server.

12. The computer-readable storage medium of any of clauses 9-11, wherein the first DNS record comprises an address record, a text record, a service record, or a name server record.

13. The computer-readable storage medium of any of clauses 9-12, wherein generating the first DNS response comprises determining that the first DNS record enables the domain name to be translated into the Internet Protocol (IP) address; determining that a first TTL associated with the first DNS record indicates that the first DNS record is stale; and specifying a DNS return code that indicates a server error.

14. The computer-readable storage medium of any of clauses 9-13, wherein the one or more resiliency policies include a copying policy associated with the first authoritative name server, and performing the one or more operations comprises copying the first DNS record from a second cache indicated via the copying policy to the first cache.

15. The computer-readable storage medium of any of clauses 9-14, wherein the first cache is associated with a first recursive resolver and the second cache is associated with a second recursive resolver.

16. The computer-readable storage medium of any of clauses 9-15, wherein determining that the first authoritative name server is unavailable comprises evaluating a status record that is attached to a previous DNS response received from the authoritative name server.

17. The computer-readable storage medium of any of clauses 9-16, wherein the one or more operations comprise obtaining the first DNS record from a zone transfer by a resiliency orchestrator that includes the first DNS record, and storing the first DNS record in the first cache.

18. The computer-readable storage medium of any of clauses 9-17, wherein the resiliency orchestrator comprises a shadow master.

19. In some embodiments, a system comprises a memory storing a resolution resiliency application; and a processor that is coupled to the memory, wherein, when executed by the processor, the resolution resiliency application configures the processor to determine that a first authoritative name server that is responsible for a domain name specified in a first DNS query is unavailable; in response to determining that the first authoritative name server is unavailable, perform one or more operations on a first cache based on one or more resiliency policies associated with the first authoritative name server to modify the first cache, wherein the first cache is used to store DNS records; and generate a first DNS response to the first DNS query based on a first DNS record stored in the modified first cache.

20. The system of clause 19, wherein the one or more resiliency policies include a time-to-live (TTL) extension policy associated with the first authoritative name server, and the resolution resiliency application configures the processor to perform the one or more operations by obtaining the TTL extension policy from a second authoritative name server; and extending an expired TTL associated with a stale DNS record stored in the first cache based on the TTL extension policy.

21. The system of clause 19 or 20, wherein the one or more resiliency policies include a copying policy associated with the first authoritative name server, and the resolution resiliency application configures the processor to perform the one or more operations by copying a first DNS record from a second cache indicated via the copying policy to the first cache.

22. The system of any of clauses 19-21, wherein the first DNS record comprises an address record, a text record, a service record, or a name server record.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for responding to requests that is implemented by an authoritative name server, the method comprising:
   determining that the authoritative name server is recovering from a degraded state or a first DNS record includes invalid data;
   in response, performing one or more operations that modify at least one of:
     a response rate specifying a frequency associated with DNS responses, or
     a flush list specifying one or more DNS records that include invalid data and are to be flushed from a cache; and
   generating a first response to a first request received by the authoritative name server based on at least one of the modified response rate or the modified flush list.

2. The method of claim 1, wherein performing the one or more operations comprises specifying the first DNS record and an associated time stamp in the modified flush list.

3. The method of claim 2, wherein the first request comprises a flush inquiry, and generating the first response comprises:
   determining that the associated time stamp specifies a time that is later than a flush time specified in the first request; and
   specifying the first DNS record in a flush update to indicate that the first DNS record is invalid.

4. The method of claim 1, wherein performing the one or more operations comprises computing the modified response rate based on an amount of time that has elapsed from when the authoritative name server began recovering from the degraded state.

5. The method of claim 1, further comprising, prior to generating the first response, determining a prioritization criterion for responding to DNS queries.

6. The method of claim 1, wherein the first request comprises a DNS query associated with an address record, a text record, a service record, or a name server record.

7. The method of claim 6, wherein generating the first response comprises rejecting the DNS query based on the modified response rate, and specifying a DNS return code that indicates an error associated with a server.

8. The method of claim 6, wherein generating the first response comprises accepting the DNS query based on the modified response rate, and performing one or more DNS resolution operations based on a plurality of DNS records associated with the authoritative name server.

9. One or more non-transitory computer-readable storage media including instructions that, when executed by one or more processors, cause the one or more processors to perform the steps of:
   determining that an authoritative name server is recovering from a degraded state or a first DNS record includes invalid data;
   in response, performing one or more operations that modify at least one of:
     a response rate specifying a frequency associated with DNS responses, or
     a flush list specifying one or more DNS records that include invalid data and are to be flushed from a cache; and
   generating a first response to a first request received by the authoritative name server based on at least one of the modified response rate or the modified flush list.

10. The one or more non-transitory computer-readable storage media of claim 9, wherein performing the one or more operations comprises specifying the first DNS record and an associated time stamp in the modified flush list.

11. The one or more non-transitory computer-readable storage media of claim 10, wherein the first request comprises a flush inquiry, and generating the first response comprises:
    determining that the associated time stamp specifies a time that is later than a flush time specified in the first request; and
    specifying the first DNS record in a flush update to indicate that the first DNS record is invalid.

12. The one or more non-transitory computer-readable storage media of claim 10, further comprising instructions that, when executed by the one or more processors, cause the one or more processors to perform the step of setting the associated time stamp equal to a time at which the authoritative name server began recovering from the degraded state.

13. The one or more non-transitory computer-readable storage media of claim 9, wherein performing the one or more operations comprises computing the modified response rate based on an amount of time that has elapsed from when the authoritative name server began recovering from the degraded state.

14. The one or more non-transitory computer-readable storage media of claim 13, further comprising instructions that, when executed by the one or more processors, cause the one or more processors to perform the steps of:
    determining that the authoritative name server has fully recovered from the degraded state, and
    setting the modified response rate to specify that the frequency is unlimited.

15. The one or more non-transitory computer-readable storage media of claim 9, wherein the first request comprises a DNS query associated with an address record, a text record, a service record, or a name server record, and further comprising, prior to generating the first response, determining a prioritization criterion for responding to DNS queries.

16. The one or more non-transitory computer-readable storage media of claim 15, wherein the prioritization criterion specifies that the DNS query is associated with a high priority when a DNS server that transmitted the DNS query is included in a plurality of DNS servers specified via a whitelist.

17. A system comprising:
a memory storing a zone resiliency application; and
a processor that is coupled to the memory, wherein, when executed by the processor, the zone resiliency application configures the processor to:
determine that an authoritative name server is recovering from a degraded state or a first DNS record includes invalid data;
in response, perform one or more operations that modify at least one of:
a response rate specifying a frequency associated with DNS responses, or
a flush list specifying one or more DNS records that include invalid data and are to be flushed from a cache; and
generate a first response to a first request received by the authoritative name server based on at least one of the modified response rate or the modified flush list.

18. The system of claim 17, wherein the zone resiliency application configures the processor to perform the one or more operations by specifying the first DNS record and an associated time stamp in the modified flush list.

19. The system of claim 17, wherein the zone resiliency application configures the processor to perform the one or more operations by computing the modified response rate based on an amount of time that has elapsed from when the authoritative name server began recovering from the degraded state.

20. The system of claim 17, wherein the first request comprises a DNS query associated with an address record, a text record, a service record, or a name server record, and the zone resiliency application configures the processor to generate the first response by accepting the DNS query based on the modified response rate, and performing one or more DNS resolution operations based on a plurality of DNS records associated with the authoritative name server.

* * * * *